US012036801B2

(12) United States Patent
Nakatani et al.

(10) Patent No.: US 12,036,801 B2
(45) Date of Patent: Jul. 16, 2024

(54) THERMAL PRINT HEAD, THERMAL PRINTER AND METHODS FABRICATING THEREOF

(71) Applicant: ROHM CO., LTD., Kyoto (JP)

(72) Inventors: Goro Nakatani, Kyoto (JP); Nobukazu Kise, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/818,282

(22) Filed: Aug. 8, 2022

(65) Prior Publication Data

US 2023/0073451 A1 Mar. 9, 2023

(30) Foreign Application Priority Data

Sep. 9, 2021 (JP) ................................ 2021-146994

(51) Int. Cl.
*B41J 2/335* (2006.01)

(52) U.S. Cl.
CPC ........... *B41J 2/3359* (2013.01); *B41J 2/3351* (2013.01); *B41J 2/33515* (2013.01)

(58) Field of Classification Search
CPC ..... B41J 2/3359; B41J 2/3351; B41J 2/33515
See application file for complete search history.

(56) References Cited

U.S. PATENT DOCUMENTS

| | | | | |
|---|---|---|---|---|
| 2018/0354265 A1* | 12/2018 | Aoki | .................... | B41J 2/33535 |
| 2019/0263141 A1* | 8/2019 | Kimura | ...................... | B41J 2/34 |

FOREIGN PATENT DOCUMENTS

| | | | | |
|---|---|---|---|---|
| JP | 2018043425 A | 3/2018 | | |
| JP | 2018176549 A | * 11/2018 | ............. | B41J 2/335 |

* cited by examiner

*Primary Examiner* — Yaovi M Ameh
(74) *Attorney, Agent, or Firm* — HSML P.C.

(57) ABSTRACT

The present disclosure provides a thermal print head. The thermal print head includes a substrate, having a main surface facing one side in a thickness direction; a resistor layer, including a plurality of heat generating portions arranged in a main scanning direction and supported by the substrate; and a wiring layer, forming a power path to the plurality of heat generating portions and supported by the substrate. The substrate includes a convex portion protruding from the main surface and extending along the main scanning direction. The convex portion includes: a flat first surface on which each of the plurality of heat generating portions is disposed; and a first curved convex surface connected to the first surface.

20 Claims, 22 Drawing Sheets

THERMAL PRINT HEAD, THERMAL PRINTER AND METHODS FABRICATING THEREOF

TECHNICAL FIELD

The present disclosure relates to a thermal print head, a thermal printer and a method of fabricating a thermal print head.

BACKGROUND

Patent publication 1 discloses an example of a conventional thermal print head. The thermal print head described in the patent publication 1 includes a semiconductor substrate, a resistor layer having multiple heat generating portions, and a wiring layer included in a power path for energizing the multiple heat generating portions. The semiconductor substrate includes silicon. The resistor layer and the wiring layer are supported by the semiconductor substrate. The semiconductor substrate has a convex portion. The semiconductor substrate has a main surface and a protruding portion. The protruding portion is a part protruding from the main surface in a thickness direction z. The multiple heat generating portions are arranged on the protruding portion.

A print medium (for example, thermal paper) is pressed against the multiple heat generating portions by a press roller configured opposite to the multiple heat generating portions. Then, dots are printed on the print medium using heat respectively from the multiple heat generating portions. The print medium is conveyed in a sub-scanning direction by means of rotation of the press roller.

PRIOR ART DOCUMENT

Patent Publication

[Patent publication 1] Japan Patent Publication No. 2018-43425

SUMMARY OF THE PRESENT DISCLOSURE

Problems to be Solved by the Disclosure

Foreign objects are sometimes present during the conveyance of the print medium. The foreign objects are, for example, scraps of the print medium (for example, scraps of paper) or scraps of the surface layer of the thermal print head. If such foreign objects are attached to the heat generating portions, heat transfer from the heat generating portions to the print medium may be obstructed, leading to degraded printing quality.

The present disclosure is conceived of on the basis of the situation above, in the aim of providing a thermal print head capable of inhibiting the generation of foreign objects and hence mitigating degraded printing quality. Moreover, a thermal printer having the thermal print head and a method of fabricating the thermal print head are further provided.

Technical Means for Solving the Problem

According to a first embodiment of the present disclosure, a thermal print head includes: a substrate, having a main surface facing one side in a thickness direction; a resistor layer, including a plurality of heat generating portions arranged in a main scanning direction and supported by the substrate; and a wiring layer, forming a power path to the plurality of heat generating portions and supported by the substrate; wherein the substrate includes a convex portion protruding from the main surface and extending along the main scanning direction, and the convex portion includes a flat first surface on which each of the plurality of heat generating portions is disposed, and a first curved convex surface connected to the first surface.

According to a second embodiment of the present disclosure, a thermal printer includes: the thermal print head provided by the first embodiment; and a platen, facing the thermal print head and conveying a print medium in the sub-scanning direction.

According to a third embodiment of the present disclosure, a method of fabricating a thermal print head includes: providing a substrate made of a monocrystalline semiconductor; processing the substrate to have a main surface facing one side in a thickness direction and have a convex portion protruding from the main surface and extending in a main scanning direction; forming a resistor layer supported by the substrate and including a plurality of heat generating portions arranged in the main scanning direction; and forming a wiring layer which is supported by the substrate and forms a power path to the plurality of heat generating portions; wherein the convex portion includes a flat first surface on which each of the plurality of heat generating portions is disposed, and a first curved convex surface connected to the first surface, and wherein the processing of the substrate includes forming an intermediate convex body having the first surface and protruding from the main surface, and forming a first curved convex surface on the intermediate convex body.

Effects of the Present Disclosure

The thermal print head according to the present disclosure is capable of inhibiting the generation of foreign objects and hence mitigating degraded printing quality. Moreover, the thermal printer according to the present disclosure is capable of inhibiting the generation of foreign objects and hence mitigating degraded printing quality. Further, the method of fabricating a thermal print head according to the present disclosure is capable of manufacturing a thermal print head that is conducive to inhibiting the generation of foreign objects and hence mitigating degraded printing quality.

DETAILED DESCRIPTION OF THE EMBODIMENTS

Figure 1:
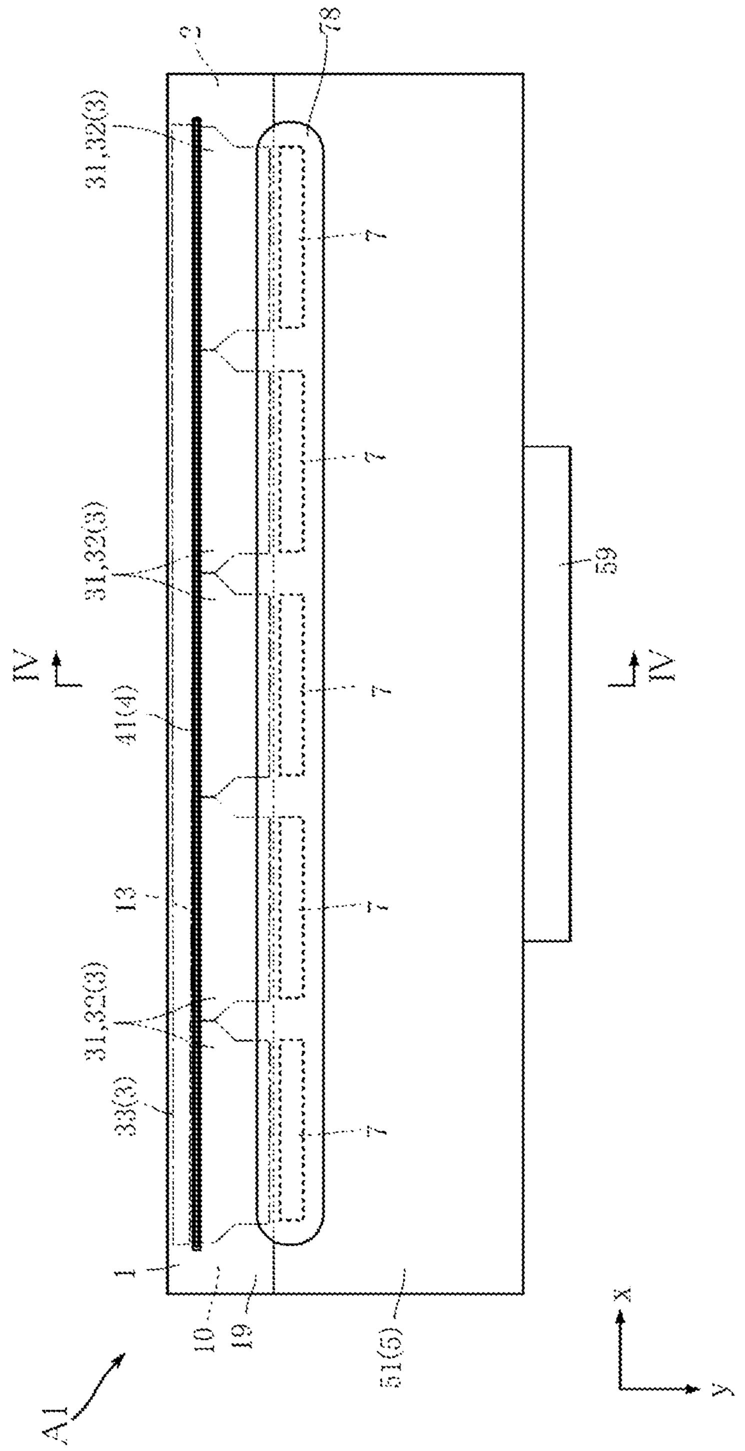
FIG. 1 is a top view of a thermal print head according to an embodiment.

A thermal print head, a thermal printer and a method of fabricating a thermal print head of the present disclosure are described in detail by way of preferred embodiments with the accompanying drawings below. In the description below, the same or similar constituting elements are provided with the same numerals and denotations, and repeated description is omitted. The expressions "first", "second" and "third" in the present disclosure are used simply for denotation purposes, and are not intended for sorting these objects.

In the present disclosure, unless otherwise specified, expressions "an object A is formed at an object B" and "an object A is formed on (over/above) an object B" include "an object A is directly formed at an object B" and "an object A is formed at an object B while another object is disposed between the object A and the object B". Similarly, unless otherwise specified, expressions "an object A is arranged at an object B" and "an object A is arranged on (over/above) an object B" include "an object A is directly arranged at an object B" and "an object A is arranged at an object B while another object is disposed between the object A and the object B". Similarly, unless otherwise specified, an expression "an object A is located on (over/above) an object B" includes "an object A is located on (over/above) an object B by means of being in contact with the object B" and "an object A is located on (over/above) an object B while another object is disposed between the object A and the object B". Moreover, unless otherwise specified, an expression "an object A coincides with an object B when viewed in a direction" includes "an object A coincides with the entirety of an object B" and "an object A coincides with a part of an object B".

FIG. 1 to FIG. 7 show a thermal print head A1 according to an embodiment. The thermal print head A1 includes a head substrate 1, an insulating layer 19, a protective layer 2, a wiring layer 3, a resistor layer 4, a connection substrate 5, a plurality of lead wires 61 and 62, a plurality of drivers ICs 7, a protective resin 78 and a heat dissipation component 8. The thermal print head A1 is assembled in a thermal printer Pr (referring to FIG. 4) that performs printing on a print medium 99. The thermal printer Pr may employ either a thermal sensing means or a thermal transfer means. The print medium 99 may be printing paper, information paper, or plastic cards. For example, in the thermal printer Pr employing a thermal sensing means, thermal paper used for barcodes or receipts is used as the print medium 99. The thermal printer Pr includes the thermal print head A1 and a press roller 91. The press roller 91 faces straight to the thermal print head A1. The thermal printer Pr sandwiches the print medium 99 between the thermal print head A1 and the press roller 91, and conveys the print medium 99 in a sub-scanning direction by the press roller 91. Different from the structure above, a platen including flat rubber may also be used in substitution for the press roller 91. The platen includes a portion of the rubber that is arcuate when viewed in a cross section, wherein the rubber is cylindrical with a large radius of curvature. In the present disclosure, the term "platen" refers to both of the press roller 91 and the flat platen.

The head substrate 1 supports the wiring layer 3 and the resistor layer 4. The head substrate 1 is shaped as a long and narrow rectangle having a main scanning direction x as the lengthwise direction. In the description below, the thickness direction of the head substrate 1 is referred to as a thickness direction z. Moreover, although one side of the thickness direction z is sometimes referred to as the top and the other side is referred to as the bottom, the terms "top", "bottom", "upper", "lower", "upper surface" and "lower surface" are for representing relative position relations of the components in the thickness direction z, and are not necessarily terms defining the direction related to the gravity. The dimensions of the head substrate 1 are not specifically defined. For example, the thickness (the dimension in the thickness direction z) is 725 μm, the dimension in the main scanning direction x is 50 mm or more and 150 mm or less, and the dimension in the sub-scanning direction y is 2.0 mm or more or 5.0 mm or less.

Figure 4:
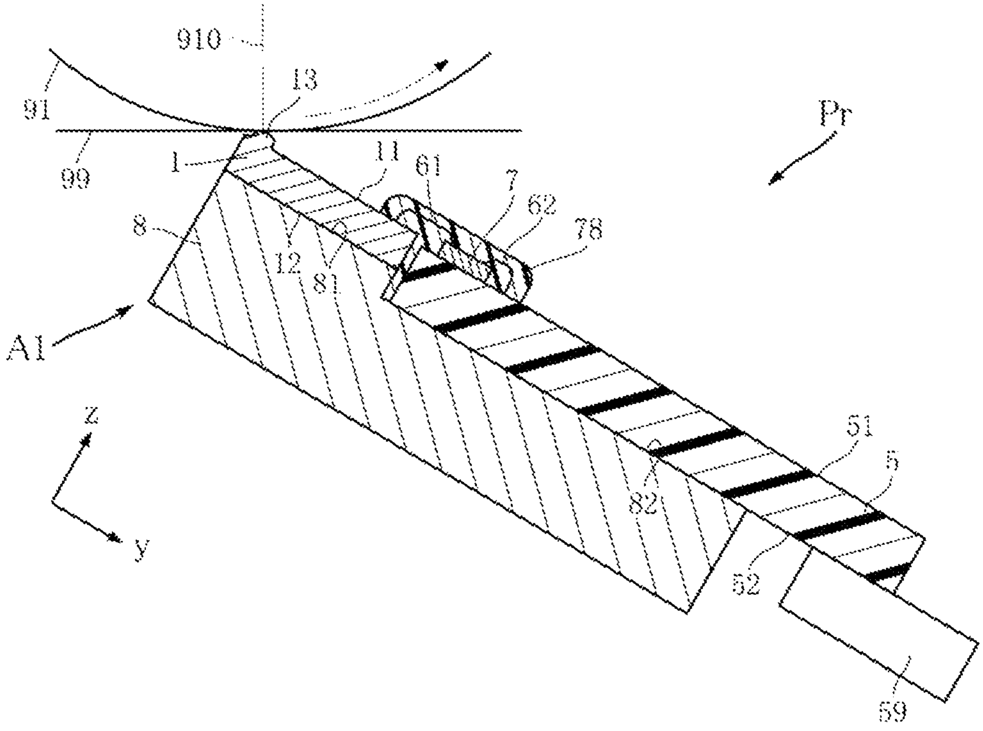
FIG. 4 is a partial enlarged cross-sectional diagram of a thermal printer having a thermal print head according to an embodiment and is a cross-sectional diagram taken along the line IV-IV in FIG. 1.
Figure 5:
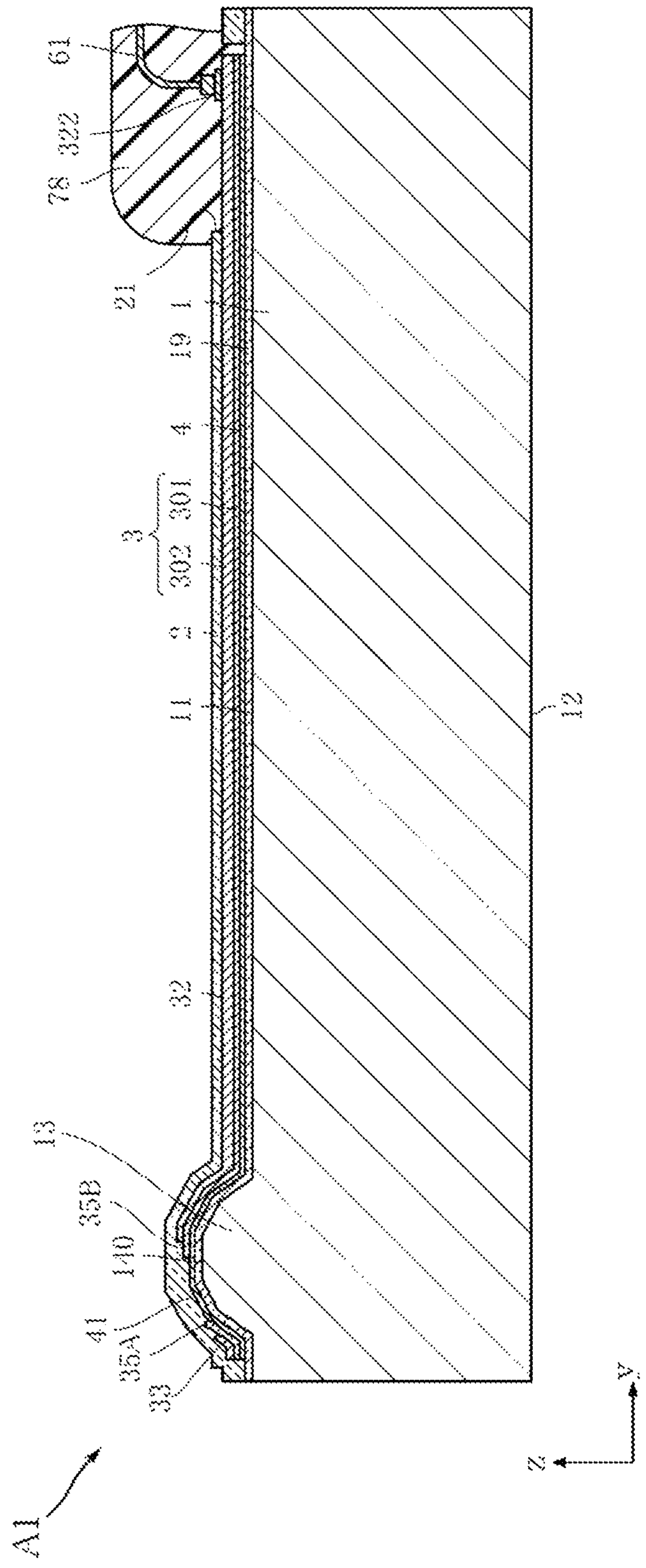
FIG. 5 is a partial enlarged diagram of an enlarged part of the cross section shown in FIG. 4, and is a cross-sectional diagram taken along the line V-V in FIG. 2.

The head substrate 1 is made of a monocrystalline semiconductor, which is, for example, silicon (Si). As shown in FIG. 4 and FIG. 5, the head substrate 1 has a main surface 11 and a back surface 12. The main surface 11 and the back surface 12 are separated in the thickness direction z, and face opposite sides from each other in the thickness direction z.

The wiring layer 3 and the resistor layer 4 are disposed on the side of the main surface 11. The head substrate 1 is equivalent to the term "substrate" recited in the claims.

Figure 2:
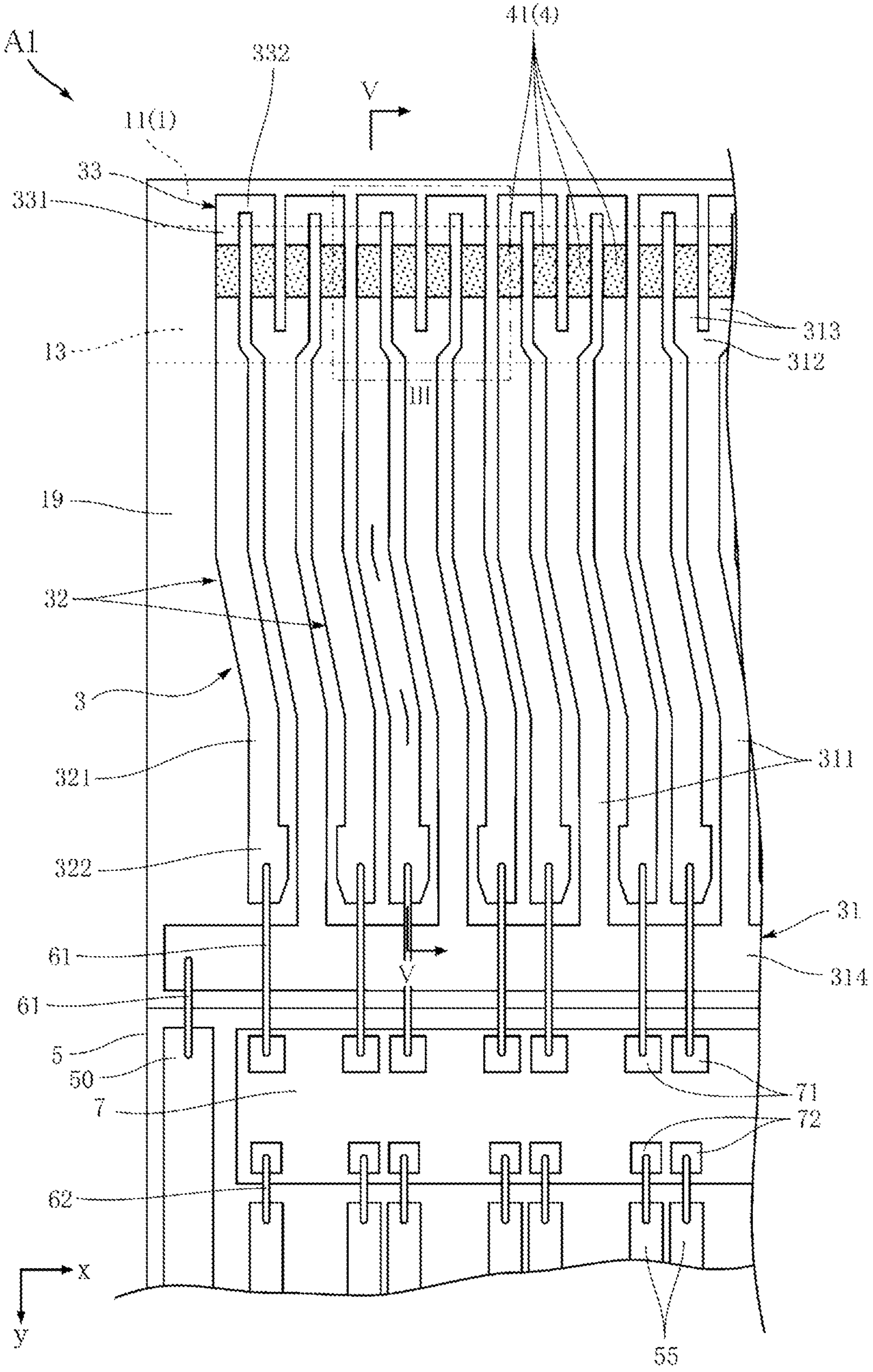
FIG. 2 is a partial enlarged diagram of a part of the top view shown in FIG. 1.
Figure 3:
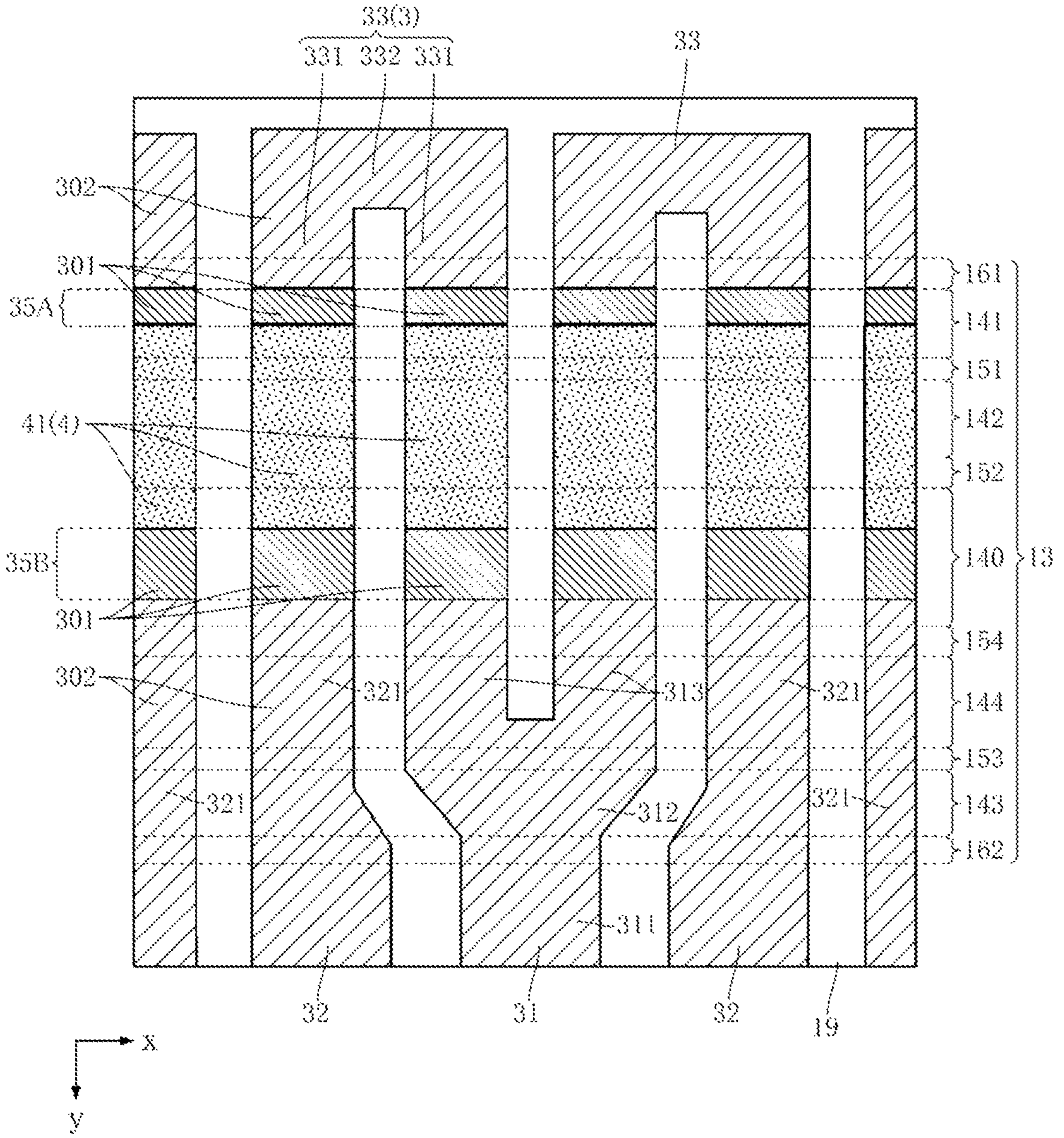
FIG. 3 is a top view of a main part of an enlarged part (region III) of FIG. 2.

The head substrate 1 includes a convex portion 13. The convex portion 13 protrudes from the main surface 11 in the thickness direction z as shown in FIG. 4 to FIG. 7, and extends long in the main scanning direction x as shown in FIG. 2 and FIG. 3. In the example shown in the drawings, the convex portion 13 is formed closer to the upstream side of the head substrate 1 in the sub-scanning direction y. The convex portion 13 includes Si that is a monocrystalline semiconductor, as being a part of the head substrate 1.

Figure 6:
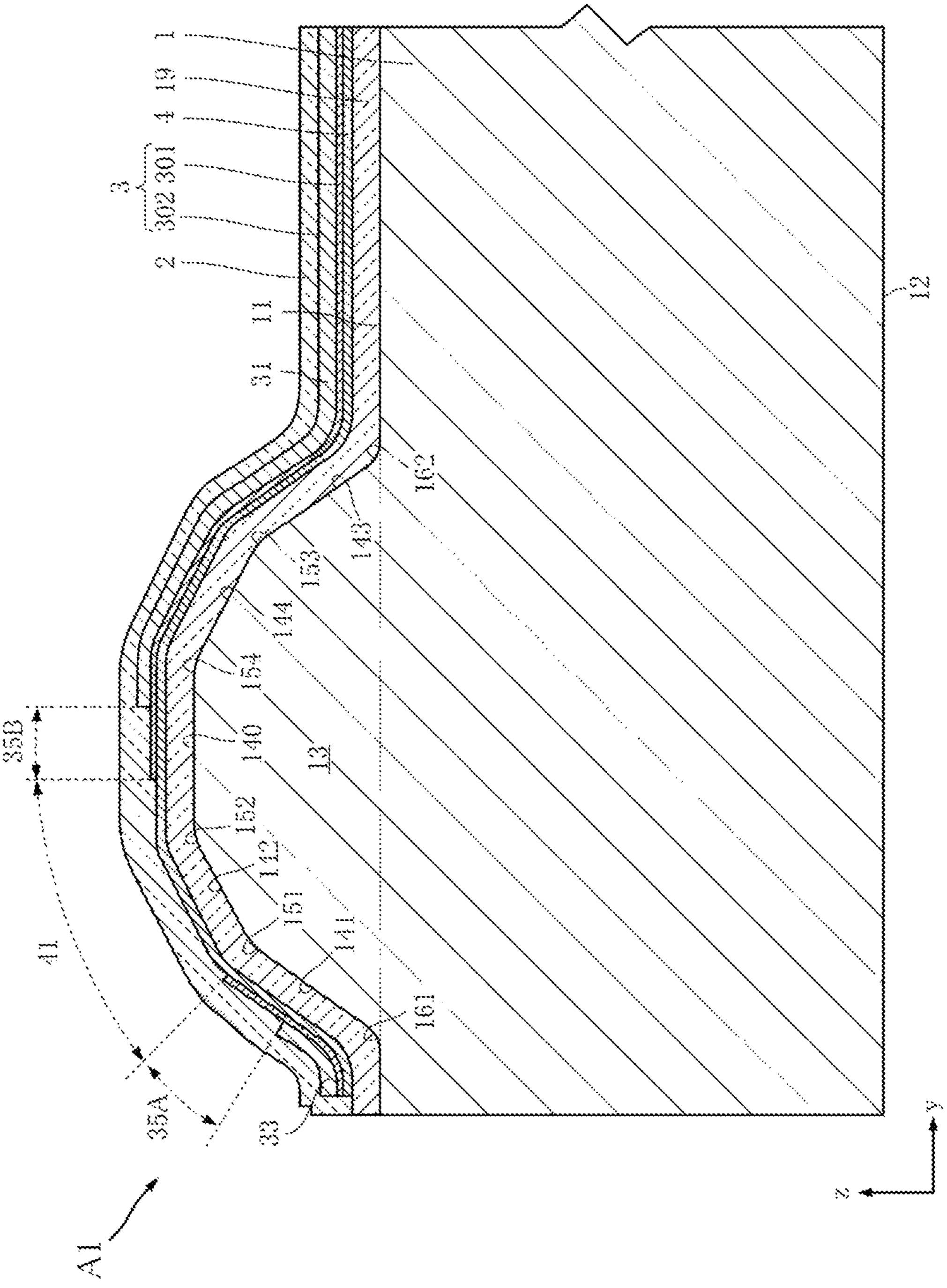
FIG. 6 is a partial enlarged diagram of an enlarged part of FIG. 5.
Figure 7:
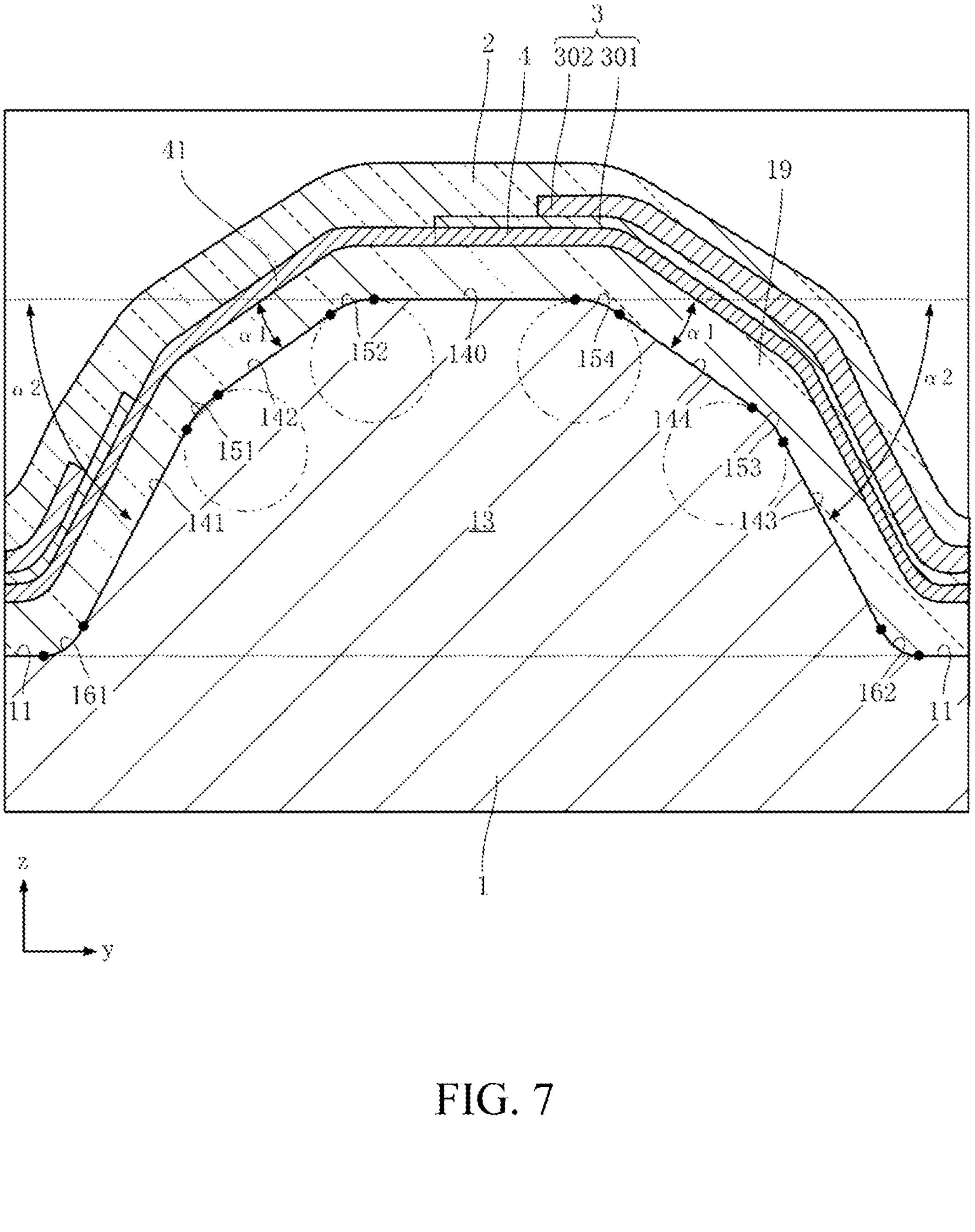
FIG. 7 is a cross-sectional diagram of a main part of an enlarged part of FIG. 6.

As shown FIG. 3, FIG. 6 and FIG. 7, the convex portion 13 includes a top surface 140, a first inclined surface 141, a second inclined surface 142, a third inclined surface 143, a fourth inclined surface 144, a first curved convex surface 151, a second curved convex surface 152, a third curved convex surface 153, a fourth curved convex surface 154, a first curved concave surface 161 and a second curved concave surface 162. For better understanding, solid dots are used to represent the boundaries of these surfaces.

As shown in FIG. 6 and FIG. 7, the top surface 140 is a part of the convex portion 13 farthest away from the main surface 11. The top surface 140 is, for example, substantially parallel to the main surface 11. When viewed in the thickness direction z, the top surface 140 is a long and narrow rectangle extending in the main scanning direction x. The top surface 140 is flat.

As shown in FIG. 3, FIG. 6 and FIG. 7, the second inclined surface 142 and the fourth inclined surface 144 are located on two sides of the top surface 140 in the sub-scanning direction y. The second inclined surface 142 is located on the upstream side in the sub-scanning direction y with respect to the top surface 140. The fourth inclined surface 144 is located on the downstream side in the sub-scanning direction y with respect to the top surface 140. Both of the second inclined surface 142 and the fourth inclined surface 144 are flat. As shown in FIG. 7, each of the second inclined surface 142 and the fourth inclined surface 144 inclines by a first inclination angle $\alpha 1$ with respect to the main surface 11. When viewed in the thickness direction z, each of the second inclined surface 142 and the fourth inclined surface 144 is a long and narrow rectangle extending long in the main scanning direction x. It is seen from FIG. 4 to FIG. 6, for example, the press roller 91 is arranged such that a normal line 910 of the press roller 91 coincides with a vertical line of the second inclined surface 142. Moreover, the convex portion 13 may also have an inclined portion (omitted from the drawing), which is connected to the second inclined surface 142 and the fourth inclined surface 144 and adjacent to two ends of the top surface 140 in the main scanning direction x.

As shown in FIG. 3, FIG. 6 and FIG. 7 the first inclined surface 141 and the third inclined surface 143 are located on opposite sides of the top surface 140 in the sub-scanning direction y with respect to the second inclined surface 142 and the fourth inclined surface 144. The first inclined surface 141 is located between the main surface 11 and the second inclined surface 142 in the sub-scanning direction y. The third inclined surface 143 is located between the main surface 11 and the fourth inclined surface 144 in the sub-scanning direction y. Both of the first inclined surface 141 and the third inclined surface 143 are flat. As shown in FIG. 7, each of the first inclined surface 141 and the third inclined surface 143 inclines by a second inclination angle $\alpha 2$ with respect to the main surface 11. The second inclination angle $\alpha 2$ is greater than the first inclination angle $\alpha 1$. When viewed in the thickness direction z, each of the first inclined surface 141 and the third inclined surface 143 is a long and narrow rectangle extending long in the main scanning direction x. Moreover, the convex portion 13 may also have an inclined portion (omitted from the drawing), which is connected to the first inclined surface 141 and the third inclined surface 143 and located on outer sides in the main scanning direction x of the top surface 140 in the main scanning direction x.

In the thermal print head A1, the main surface 11 of the head substrate 1 is a (100) surface. According to an example of the fabricating method below, the respective first inclination angles $\alpha 1$ (referring to FIG. 7) of the second inclined surface 142 and the fourth inclined surface 144 are, for example, 30.1 degrees, with respect to the main surface 11. Moreover, the respective second inclination angles $\alpha 2$ (referring to FIG. 7) of the first inclined surface 141 and the third inclined surface 143 are, for example, 54.7 degrees, with respect to the main surface 11. The dimension of the convex portion 13 in the thickness direction z is, for example, 150 μm or more and 300 μm or less.

As shown in FIG. 3, FIG. 6 and FIG. 7, the first curved convex surface 151 is disposed and connected between the first inclined surface 141 and the second inclined surface 142. The second curved convex surface 152 is disposed and connected between the second inclined surface 142 and the top surface 140. Thus, the first curved convex surface 151 and the second curved convex surface 152 are connected to two sides of the second inclined surface 142 in the sub-scanning direction y, respectively. In this embodiment, the first curved convex surface 151 has a curvature substantially equal to a curvature of the second curved convex surface 152. In FIG. 7, approximate circles including the respective curves of the first curved convex surface 151 and the second curved convex surface 152 are represented by imaginary lines (double-dotted lines), respectively.

As shown in FIG. 3, FIG. 6 and FIG. 7, the third curved convex surface 153 is disposed and connected between the third inclined surface 143 and the fourth inclined surface 144. The fourth curved convex surface 154 is disposed and connected between the fourth inclined surface 144 and the top surface 140. Thus, the third curved convex surface 153 and the fourth curved convex surface 154 are connected to two sides of the fourth inclined surface 144 in the sub-scanning direction y, respectively. In this embodiment, the third curved convex surface 153 has a curvature substantially equal to a curvature of the fourth curved convex surface 154. Moreover, the third curved convex surface 153 has a curvature substantially equal to a curvature of the first curved convex surface 151, and the fourth curved convex surface 154 has a curvature substantially equal to a curvature of the second curved convex surface 152. In FIG. 7, approximate circles including the respective curves of the third curved convex surface 153 and the fourth curved convex surface 154 are represented by imaginary lines (double-dotted lines), respectively.

As shown in FIG. 3, FIG. 6 and FIG. 7, the first curved concave surface 161 is disposed and connected between the main surface 11 and the first inclined surface 141. As shown in FIG. 3, FIG. 6 and FIG. 7, the second curved concave surface 162 is disposed and connected between the main surface 11 and the third inclined surface 143.

The convex portion 13 includes a flat first surface on which each of a plurality of heat generating portions 41 is disposed. In the thermal print head A1, the first surface includes the second inclined surface 142. In the thermal print head A1, it is seen from FIG. 4 and FIG. 6, the print medium 99 is conveyed from the first curved convex surface 151 toward the first surface (the second inclined surface 142) in the sub-scanning direction y. Different from the structure above, the print medium 99 may also be conveyed from the second curved convex surface 152 toward the second inclined surface 142 in the sub-scanning direction y.

As shown in FIG. 5 and FIG. 6, the insulating layer 19 covers the main surface 11 and the convex portion 13. The insulating layer 19 is formed to more completely insulate the side of the main surface 11 of the head substrate 1. The insulating layer 19 is made of an insulating material, and for example, $SiO_2$ (TEOS-$SiO_2$) formed as a film by using tetraethoxysilane (TEOS) as a raw gas. Alternatively, $SiO_2$ or SiN formed as a film by other means may also be used in substitution for TEOS-$SiO_2$. The thickness of the insulating layer 19 is not specifically defined, and is, for example, 5 μm or more and 15 μm or less, and preferably 5 μm or more and 10 μm or less.

The resistor layer 4 is supported by the head substrate 1. In this embodiment, as shown in FIG. 5 and FIG. 6, the resistor layer 4 is supported by the head substrate 1, with the insulating layer 19 interposed in between. The resistor layer 4 includes the plurality of heat generating portions 41. The plurality of heat generating portions 41 are selectively energized to partially heat the print medium 99. Each of the heat generating portions 41 is a region of the resistor layer 4 exposed from the wiring layer 3. The plurality of heat generating portions 41 are arranged in the main scanning direction x, and are spaced from one another in the main scanning direction x. The shape of each of the heat generating portions 41 is not specifically defined, and is, for example, a rectangle having the sub-scanning direction y as the lengthwise direction when viewed in the thickness direction z. The resistor layer 4 is made of a material having resistance greater than that of the material forming the wiring layer 3. The resistivity of the resistor layer 4 is preferably $10^{-6}$ Ωm or more. Alternatively, the resistor layer 4 may also be made of TaN, or $TaSiO_2$, TiON, polycrystalline silicon (polySi), $Ta_2O_5$, $RuO_2$, RuTiO or TaSiN in substitution for TaN. The method of forming the resistor layer 4 is not specifically defined, and may be performed by means of, for example, sputtering, chemical vapor deposition (CVD) or plating; the method of forming is appropriately selected according to the material used. For example, when the resistor layer 4 is made of TaN, the resistor layer 4 is formed by means of sputtering. The thickness of the resistor layer 4 is not specifically defined, and is, for example, 0.02 μm or more and 0.1 μm or less, and preferably approximately 0.08 μm.

The heat generating portions 41 are arranged on the convex portion 13. In the example shown in FIG. 6, each of the heat generating portions 41 is formed from the first inclined surface 141 to cross the top surface 140. An end portion of each of the heat generating portions 41 on the upstream side in the sub-scanning direction y is located on the first inclined surface 141, and an end portion of each of the heat generating portions 41 on the downstream side in the sub-scanning direction y is located on the top surface 140. Different from the structure above, each of the heat generating portions 41 may also be structured in a way that the end portion on the upstream side in the sub-scanning direction y and the end portion on the downstream side in the sub-scanning direction y are both located on the second inclined surface 142. When viewed in the thickness direction z, the center of each of the heat generating portions 41 in the sub-scanning direction y coincides with the second inclined surface 142. The positions of the heat generating portions 41 are not limited to the positions shown in FIG. 6, given being arranged on the convex portion 13. For better understanding, the heat generating portions 41 are represented in dot-shaded patterns in FIG. 3.

The wiring layer 3 forms a power path for energizing the plurality of heat generating portions 41. The wiring layer 3 is supported by the head substrate 1. As shown in FIG. 5 and FIG. 6, the wiring layer 3 is laminated on the resistor layer 4. The shape and configuration of the wiring layer 3 are not limited to the example shown in the drawings. The wiring layer 3 has a common electrode 31, a plurality of individual electrodes 32 and a plurality of relay electrodes 33.

The plurality of relay electrodes 33 are arranged equidistantly in the main scanning direction x. The plurality of relay electrodes 33 are located on the upstream side of the plurality of heat generating portions 41 in the sub-scanning direction y.

As shown in FIG. 2 and FIG. 3, each of the relay electrodes 33 includes two strip portions 331 and a connecting portion 332. The two strip portions 331 are strips extending in the sub-scanning direction y. The two strip portions 331 are spaced in the main scanning direction x, and are arranged substantially parallel to each other. The two strip portions 331 are connected to the adjacent heat generating portions 41, respectively. In the examples shown in FIG. 2 and FIG. 3, the two strip portions 331 are connected to the heat generating portions 41 from the upstream side in the sub-scanning direction y, respectively. The dimensions of the two strip portions 331 in the main scanning direction x are substantially equal. The connecting portion 332 is connected to end portions on the opposite side in the sub-scanning direction y with respect to end portions connected to the two strip portions 331, respectively. The connecting portion 332 is a strip extending in the main scanning direction x.

As shown in FIG. 2, the common electrode 31 includes a plurality of straight portions 311, a plurality of branch portions 312, a plurality of strip portions 313 and a connecting portion 314. The plurality of straight portions 311 appear as strips respectively extending in the sub-scanning direction y. The plurality of straight portions 311 are equidistantly arranged in the main scanning direction x. The branch portions 312 and two strip portions 313 are provided on a front side (the upstream side in the sub-scanning direction y) of each of the plurality of straight portions 311. These two strip portions 313 are connected to the adjacent heat generating portions 41, respectively. In the examples shown in FIG. 2, the two strip portions 313 are connected to the heat generating portions 41 from the downstream side in the sub-scanning direction y, respectively. The dimension of each of the strip portions 313 in the main scanning direction x is substantially equal to the dimension of each of the strip portions 331 in the main scanning direction x. Moreover, when viewed in the sub-scanning direction y, the strip portions 313 coincide with the strip portions 331. The plurality of branch portions 312 are connected to a front end of each of the straight portions 311. The plurality of branch portions 312 are connected to each straight portion 311 on end portions on a side opposite to end portions connected to the two strip portions 313 in the sub-scanning direction y. The connecting portion 314 is located on a base end side (the upstream side in the sub-scanning direction y) of the plurality of straight portions 311, and extends in the main scanning direction x. The plurality of straight portions 311 are connected to the connecting portion 314. As shown in FIG. 2, the connecting portion 314 is connected to a connector 59 through the lead wire 61 and a wire 50 of the connection substrate 5, and is applied with a driving voltage.

The plurality of individual electrodes 32 have a polarity opposite to that of the common electrode 31. As shown in FIG. 2, the plurality of individual electrodes 32 are spaced in the main scanning direction x. As shown in FIG. 2, each of the plurality of individual electrodes 32 includes a strip portion 321 and a pad portion 322. The strip portion 321 of each of the individual electrodes 32 appears as a strip extending in the sub-scanning direction y, and is located on the downstream side of the heat generating portion 41 in the sub-scanning direction y. In the examples shown in FIG. 2, the strip portion 321 is connected to the heat generating portion 41 on a front side (the upstream side in the sub-scanning direction y). The dimension of the strip portion 321 in the main scanning direction x is substantially equal to the dimension of each of the strip portions 331 in the main scanning direction x. Moreover, when viewed in the sub-scanning direction y, end portions of the strip portion 321 on the upstream side in the sub-scanning direction y coincide with the strip portions 331. In each of the individual electrodes 32, the pad portion 322 is provided at an end portion of the strip portion 321 on the downstream side in the sub-scanning direction y. The pad portion 322 is connected to any one of output pads 71 (to be described shortly) of any driver of the plurality of driver ICs 7 through the lead wire 61.

In the thermal print head A1, as shown in FIG. 2, each of the straight portions 311 of the common electrode 31 is configured as being sandwiched between two strip portions 321 of the individual electrodes 32. The heat generating portion 41 connected to one of the two strip portions 331 of each of the relay electrodes 33 is connected to the common electrode 31, and the heat generating portion 41 connected to the other of the two strip portions 331 of each of the relay electrodes 33 is connected to any one of the plurality of individual electrodes 32. Thus, by energizing each of the individual electrodes 32, a current flows through the heat generating portion 41 connected to the individual electrodes 32 and a the heat generating portion 41 connected to the heat generating portion 41 through the relay electrode 33, thereby enabling the heat generating portions 41 to generate heat. That is to say, two heat generating portions 41 are enabled to generate heat at the same time. In the thermal print head A1, when the heat generating portions 41 are energized, the current flows in the sub-scanning direction y in the heat generating portions 41.

As shown in FIG. 5 and FIG. 6, the wiring layer 3 (the common electrode 31, the plurality of individual electrodes 32 and the plurality of relay electrodes 33 respectively) is formed to include a first conductor layer 301 and a second conductor layer 302 laminated in the thickness direction z. For better understanding, in FIG. 3, the first conductor layer 301 and the second conductor layer 302 are in line-shaded patterns.

As shown in FIG. 5 and FIG. 6, the first conductor layer 301 is formed on the resistor layer 4. The first conductor layer 301 is made of a material of which a resistance value per unit length in the sub-scanning direction y is less than that of the resistor layer 4 and more than that of the second conductor layer 302. The electrical conductivity of the first conductor layer 301 is, for example, preferably $10^{-6}$ to $10^{-7}$ Ωm. Moreover, the thermal conductivity of the first conductor layer 301 is, for example, preferably less than 100 W/m. The material forming the first conductor layer 301 is, for example, titanium (Ti), or Ta, Ga, Sn, PtIr, Pt, thallium (Tl), vanadium (V) or Cr in substitution for Ti. The method of forming the first conductor layer 301 is not specifically defined, and may be performed by means of, for example, sputtering, CVD or plating; the method of forming is appropriately selected according to the material used. For example, when the first conductor layer 301 is made of Ti, the first conductor layer 301 is formed by means of sputtering. The thickness of the first conductor layer 301 is not specifically defined, and is, for example, 0.1 μm or more and 0.2 μm or less.

As shown in FIG. 5 and FIG. 6, the second conductor layer 302 is formed on the first conductor layer 301. The second conductor layer 302 covers a portion of the first conductor layer 301. Thus, the second conductor layer 301 includes a part exposed from the second conductor layer 302. The second conductor layer 302 is made of a material of which a resistance value per unit length in the sub-scanning direction y is less than that of the resistor layer 4 and that of the first conductor layer 301. The resistivity of the second conductor layer 302 is, for example, preferably $10^{-7}$ Ωm or less. Moreover, the second conductor layer 302 is made of a material of which the thermal conductivity is more than that of the first conductor layer 301. The thermal conductivity of the second conductor layer 302 is, for example, preferably 100 W/m or more. The material forming the second conductor layer 302 is, for example, Cu, or Cu alloy, A1, A1 alloy, Au, Ag, Ni or tungsten (W) in substitution for Cu. The method of forming the second conductor layer 302 is not specifically defined, and may be performed by means of, for example, sputtering, CVD or plating; the method of forming is appropriately selected according to the material used. For example, when the second conductor layer 302 is made of Cu, the second conductor layer 302 is formed by means of sputtering. Moreover, when the second conductor layer 302 is formed by Au, Ag, or Ni, it is generally formed by means of plating; however, in these cases, the second conductor layer 302 may also include a seed layer (for example, Cu). The second conductor layer 302 is thicker than the first conductor layer 301. The thickness of the second conductor layer 302 is determined depending on the material used and the value of the current flowing in the wiring layer 3. The thickness of the second conductor layer 302 is, for example, 0.5 μm or more and 5 μm or less.

In the thermal print head A1, each part below includes the first conductor layer 301 (either of a sub heat generating portion 35A and 35B to be described below) exposed from the second conductor layer 302. As shown in FIG. 3, each part is a part of each of each strip portion 313 (the common electrode 31), each strip portion 321 (each individual electrode 32) and each strip portion 331 (each relay electrode 33) that is connected to each heat generating portion 41. That is to say, each of each strip portion 313 (the common electrode 31), each strip portion 321 (each individual electrode 32) and each strip portion 331 (each relay electrode 33) includes a part formed only by the first conductor layer 301 and a part formed by laminating the first conductor layer 301 and the second conductor layer 302. Different from the structure above, the part connected to each of the heat generating portions 41 may also be a structure in the form of laminating the second conductor layer 302 on the first conductor layer 301. That is to say, each of each strip portion 313 (the common electrode 31), each strip portion 321 (each individual electrode 32) and each strip portion 331 (each relay electrode 33) includes the first conductor layer 301 and the second conductor layer 302 laminated within respective forming ranges.

As shown in FIG. 6, the wiring layer 3 has a pair of sub heat generating portions 35A and 35B for each of the plurality of heat generating portions 41.

As shown in FIG. 6, the pair of sub heat generating portions 35A and 35B include the part of the first conductor layer 301 exposed from the second conductor layer 302. That is to say, the pair of sub heat generating portions 35A and 35B are the part where the second conductor layer 302 is not laminated on the first conductor layer 301 in the wiring layer 3. One pair of sub heat generating portions 35A and 35B are adjacent to two ends of each of the heat generating portions 41 in the sub-scanning direction y. The sub heat generating portion 35A is adjacent to each of the heat generating portions 41 from the upstream side in the sub-scanning direction y, and the sub heat generating portion 35B is adjacent to each of the heat generating portions 41 from the downstream side in the sub-scanning direction y. In the example shown in FIG. 6, the sub heat generating portion 35A is formed on the first inclined surface 141, and the sub heat generating portion 35B is formed on the top surface 140.

Because the respective resistance values of the first conductor layer 301, the second conductor layer 302 and the resistor layer 4 have the relationship described above, resistance values per unit length of each of the sub heat generating portions 35A and 35B in the sub-scanning direction y is a value between those of each of the heat generating portions 41 and the part where the first conductor layer 301 and the second conductor layer 302 are laminated. Accordingly, when each of the heat generating portions 41 is energized, the amount of heat generated by one pair of sub heat generating portions 35A and 35B is less than the amount of heat generated by each of the heat generating portions 41 and more than the amount of heat generated by the part where the first conductor layer 301 and the second conductor layer 302 are laminated.

The protective layer 2 covers the wiring layer 3 and the resistor layer 4, and protects the wiring layer 3 and the resistor layer 4. In FIG. 2 and FIG. 3, the protective layer 2 is omitted. The protective layer 2 is made of an insulative material. The insulative material is, for example, silicon nitride (SiN), or silicon oxide ($SiO_2$), silicon carbide (SiC) or aluminum nitride (AlN) in substitution for SiN. The protective layer 2 is made of a single layer or multiple layers of the insulative material. The thickness of the protective layer 2 is not specifically defined, and is, for example, 1.0 μm or more and 10 μm or less.

As shown in FIG. 5, the protective layer 5 has a plurality of pad openings 21. The pad openings 21 pass through the protective layer 2 in the thickness direction z. The plurality of pad openings 21 respectively expose the pad portions 322 of the individual electrodes 32. Different from the example shown in the drawings, the plurality of pad openings 21 may also be filled with an electrically conductive material. In this case, a plated layer may be further formed on the electrically conductive material. The structure of the plated layer is not specifically defined; for example, Ni, palladium (Pd), and Au are sequentially laminated on the surface of the electrically conductive material.

As shown in FIG. 1 and FIG. 4, the connection substrate 5 is disposed on the downstream side in the sub-scanning direction y with respect to the head substrate 1. The connection substrate 5 is, for example, a printed circuit board (PCB) substrate, and is mounted with the driver ICs 7 and the connector 59 to be described shortly. The shape of the connection substrate 5 is not specifically defined, and is a rectangle having the main scanning direction x as the lengthwise direction in this embodiment. As shown in FIG. 4, the connection substrate 5 has a main surface 51 and a back surface 52. The main surface 51 is a surface facing the same side as the main surface 11 of the head substrate 1, and the back surface 52 is a surface facing the same side as the back surface 12 of the head substrate 1. In this embodiment, the main surface 51 is located at a position closer to the lower side of the drawings in the thickness direction z than the main surface 11.

A plurality of control electrodes 55 are formed on the connection substrate 5. As shown in FIG. 2, each of the control electrodes 55 is arranged on the main surface 51, and is disposed at a position closer to the downstream side in the sub-scanning direction y than the driver IC 7. Each of the control electrodes 55 extends in the sub-scanning direction y. Each of the control electrodes 55 is connected to any one of input pads 72 (to be described shortly) of the driver IC 7 through the lead wire 62, and is connected to the connector 59 through the wire of the connection substrate 5.

The plurality of lead wires 61 and 62 conduct two separated parts. The plurality of lead wires 61 and 62 are bonding wires, respectively. As shown in FIG. 2, the plurality of lead wires 61 include lead wires for conducting each of the individual electrodes 32 (the pad portions 322) and the driver IC 7, and lead wires for conducting the common electrode 31 (the connecting portion 314) and the control electrodes 55. The plurality of lead wires 62 include lead wires for conducting the driver IC 7 and the control electrodes 55.

The plurality of driver ICs 7 are for selectively energizing the plurality of heat generating portions 41. The number of the plurality of driver ICs 7 are appropriately changed according to the number of the plurality of heat generating portions 41. The energization control of the driver ICs 7 is performed according to signals input from the outside of the thermal print head A1 through the connector 59, the wires of the connection substrate 5 and the control electrodes 55. Each of the driver ICs 7 is mounted on the main surface 51 of the connection substrate 5, and is connected to the plurality of individual electrodes 32 and the plurality of control electrodes 55 through the plurality of lead wires 61 and 62.

As shown in FIG. 2, a plurality of output pads 71 and a plurality of input pads 72 are arranged on an upper surface (the surface facing an upper side in the thickness direction z) of each driver IC 7. The plurality of output pads 71 are terminals in which the current driving the heat generating portions 41 flows. The plurality of output pads 71 are arranged at positions close to an end portion on the upstream side in the sub-scanning direction y in the upper surface of each driver IC 7. Each of the output pads 71 is connected to the pad portion 322 of each of the individual electrodes 32 through each of the lead wires 61. The plurality of input pads 72 are terminals for inputting respective main signals for controlling the driver ICs 7. The plurality of input pads 72 are arranged at positions close to an end portion on the downstream side in the sub-scanning direction y in the upper surface of each driver IC 7. Each of the input pads 72 is connected to each of the control electrodes 55 through each lead wire 62.

The protective resin 78 covers the plurality of driver ICs 7 and the plurality of lead wires 61 and 62. The protective resin 78 is made of, for example, insulative resin, and is, for example, black. As shown in FIG. 1 and FIG. 4, the protective resin 78 is formed in a manner of crossing the head substrate 1 and the connection substrate 5.

The connector 59 is for connecting the thermal print head A1 to the thermal printer Pr. As shown in FIG. 4, the connector 59 is installed at the connection substrate 5, and is connected to the input pad 72 of the driver IC 7 through a wiring pattern (omitted from the drawing) and the plurality of control electrodes 55 of the connection substrate 5.

The heat dissipation component 8 supports the head substrate 1 and the connection substrate 5, and is for dissipating a part of the heat generated by the plurality of heat generating portions 41 through the head substrate 1 to the outside. The heat dissipation component 8 is, for example, a block component made of a metal such as A1. As shown in FIG. 4, the heat dissipation component 8 has a first support surface 81 and a second surface 82. The first support surface 81 and the second support surface 82 face the upper side in the thickness direction z. The first support surface 81 and the second support surface 82 are arranged in the sub-scanning direction y. The first support surface 81 is located at a position closer to the upstream side in the sub-scanning direction y than the second support surface 82. As shown in FIG. 4, the back surface 12 of the head substrate 1 is joined with the first support surface 81 and the back surface 52 of the connection substrate 5 is joined with the second support surface 82.

Next, an example of a method of fabricating the thermal print head A1 is given with reference to FIG. 8 to FIG. 18 below.

Figure 8:
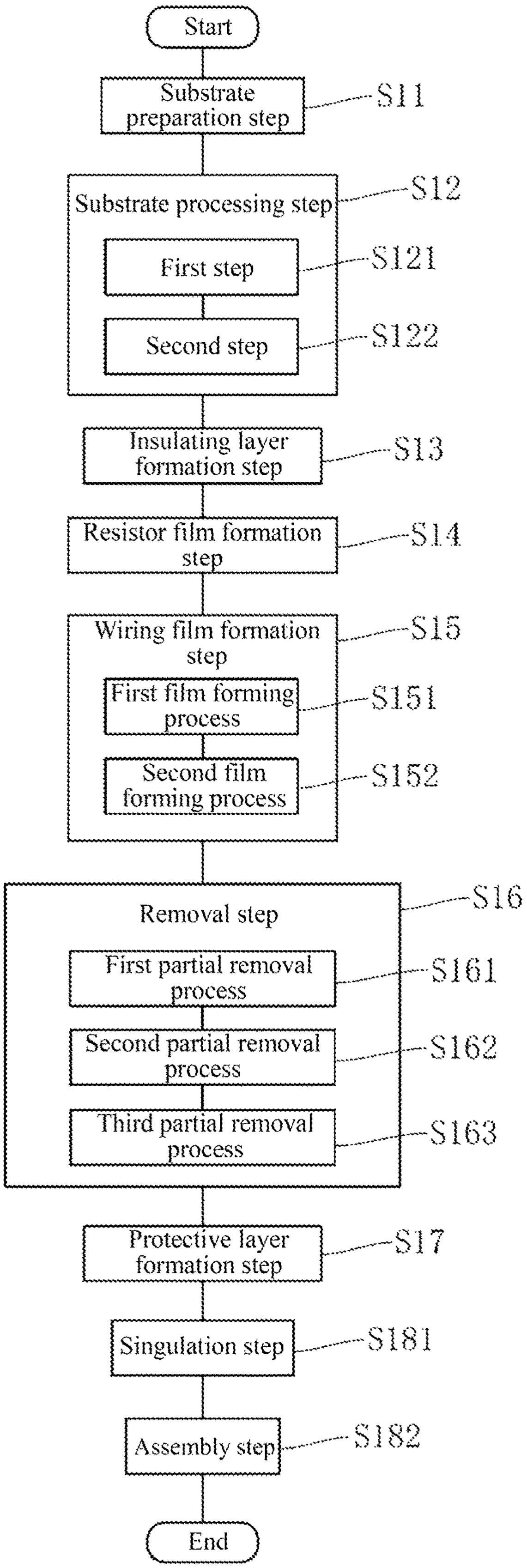
FIG. 8 is a flowchart of an example of a method of fabricating a thermal print head according to an embodiment.

As shown in FIG. 8, the method of fabricating the thermal print head A1 includes substrate preparation step S11, substrate processing step S12, insulating layer formation step S13, resistor film formation step S14, wiring film formation step S15, removal step S16, protective layer formation step S17, singulation step S181 and assembly step S182.

[Substrate Preparation Step S11]

Figure 9:
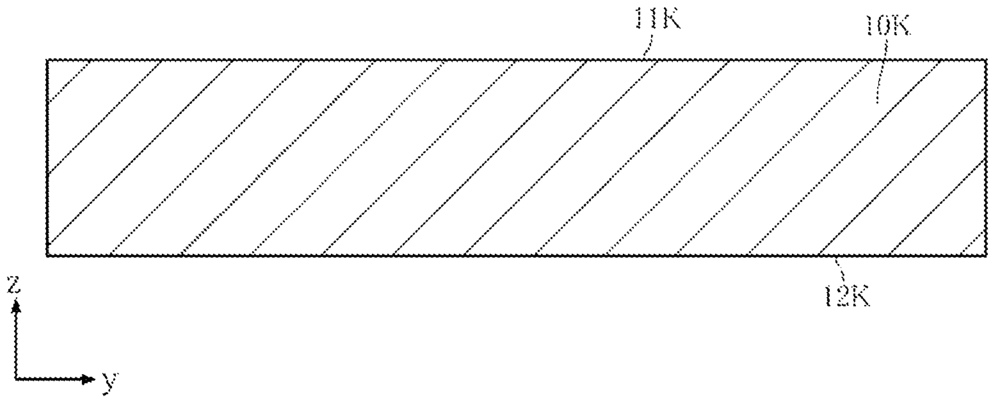
FIG. 9 is a cross-sectional diagram of a step of a method of fabricating a thermal print head according to an embodiment.

First of all, as shown in FIG. 9, a substrate 10K is prepared. The substrate 10K is made of a monocrystalline semiconductor, and is, for example, a part of a substantially circular Si wafer. One piece of Si wafer includes a plurality of substrates 10K. In the drawings below, one substrate 10K (the head substrate 1) is shown as a focus of the drawings, and the substrate 10K is a part of the Si wafer and corresponds to one thermal print head A1. The thickness of the substrate 10K (in other words, the thickness of the Si wafer) is not specifically defined, and is, for example, approximately 725 μm. As shown in FIG. 9, the prepared substrate 10K has a main surface 11K and a back surface 12K facing opposite sides from each other. The main surface 11K is a (100) surface.

[Substrate Processing Step S12]

Next, as shown in FIG. 10 to FIG. 13, the substrate 10K is processed to form a convex portion 13 on the substrate 10K. As show in FIG. 8, the substrate processing step S12 has a first step S121 and a second step S122.

Figure 10:
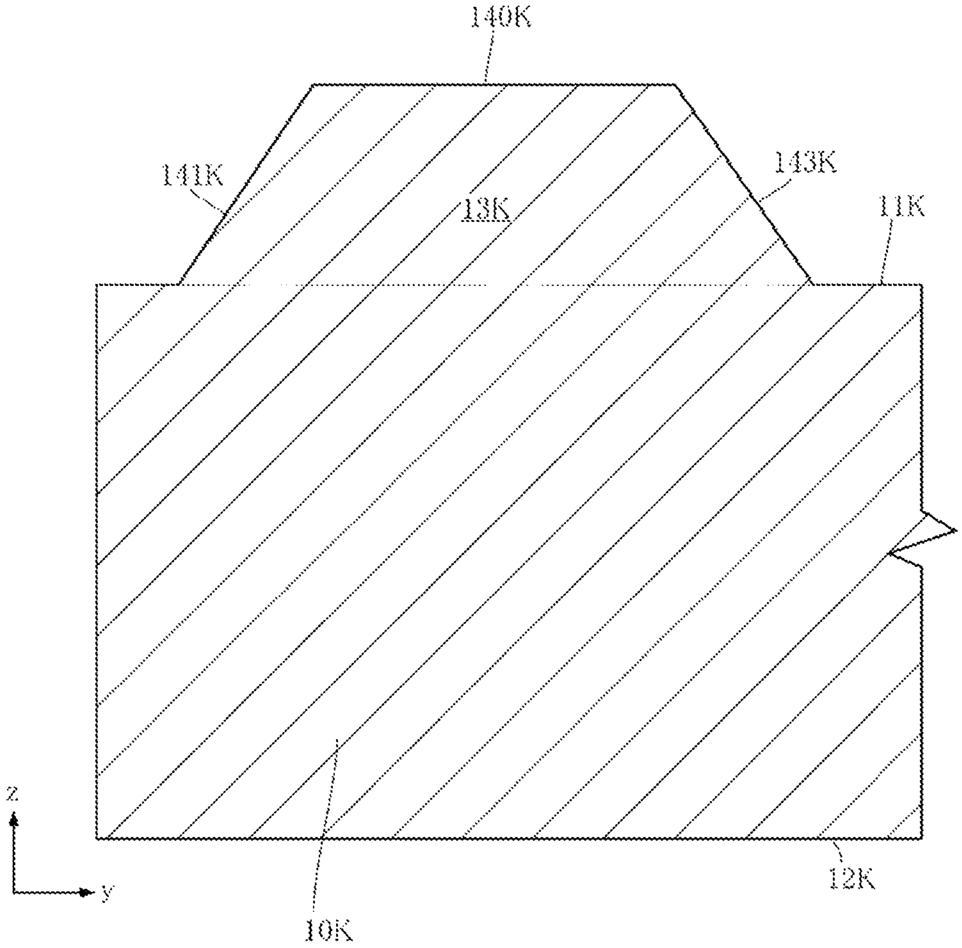
FIG. 10 is a cross-sectional diagram of a main part of a step of a method of fabricating a thermal print head according to an embodiment.
Figure 11:
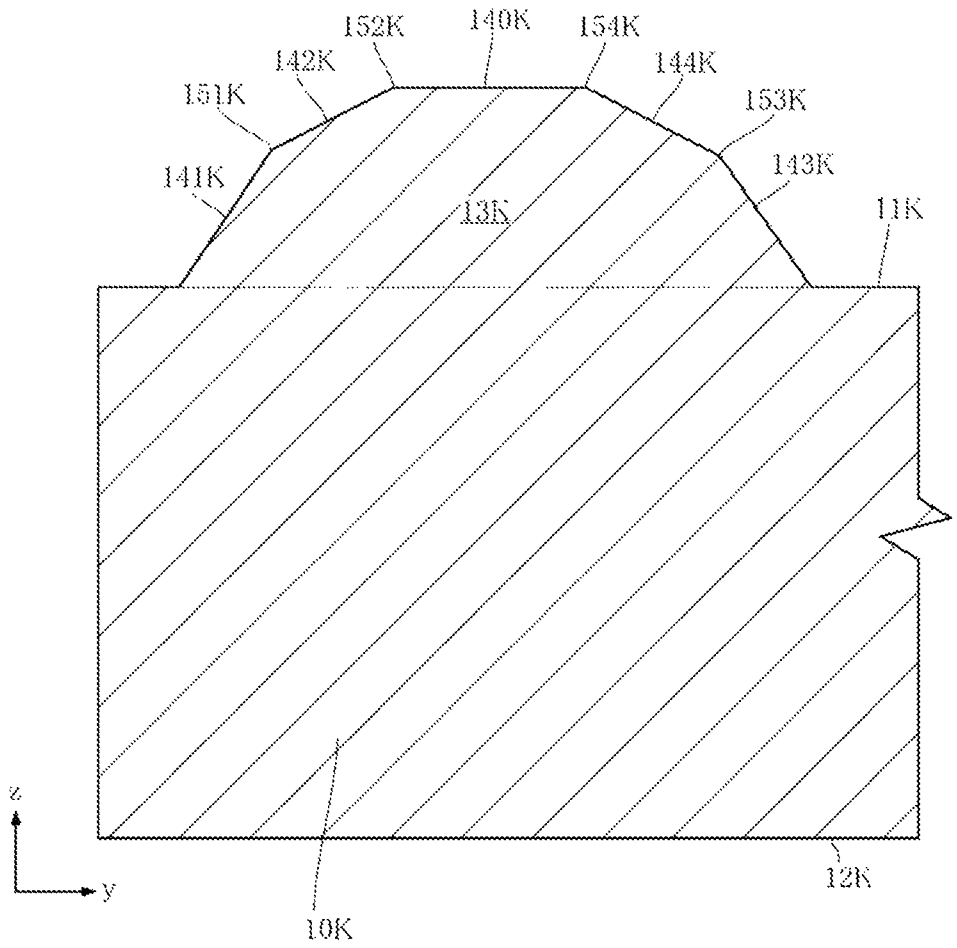
FIG. 11 is a cross-sectional diagram of a main part of a step of a method of fabricating a thermal print head according to an embodiment.

As shown in FIG. 10 and FIG. 11, in the first step S121, an intermediate convex body 13K is formed on the substrate 10K. In the first step S121, for example, etching is performed for two rounds.

In the first round of etching, once the main surface 11K is covered by a predetermined mask layer, anisotropic etching is performed by using, for example, potassium hydroxide (KOH). The agent used in the anisotropic etching may also be tetramethylammonium hydroxide (TMAH) instead of KOH; however, the processing speed (etching speed) is faster if KOH is used. The mask layer is then removed. Accordingly, as shown in FIG. 10, the intermediate convex body 13K is formed on the substrate 10K. The intermediate convex body 13K protrudes from the main surface 11K, and extends long in the main scanning direction x. The intermediate convex body 13K at this point in time has a top surface 140K and a pair of primary inclined surfaces 141K and 143K. The top surface 140K is a surface parallel to the main surface 11K, and is also a (100) surface same as the main surface 11K. The top surface 140K is a part covered by the mask layer. The pair of primary inclined surfaces 141K and 143K are respectively located on two sides of the top surface 140K in the sub-scanning direction y, and are respectively disposed between the top surface 140K and the main surface 11K. The pair of primary inclined surfaces 141K and 143K are flat surfaces respectively inclining with respect to the top surface 140K and the main surface 11K. Angles respectively formed by the pair of primary inclined surfaces 141K and 143K with the main surface 11K and the top surface 140K are 54.7 degrees.

In the second round of etching, anisotropic etching is performed by using, for example, TMAH. The agent used in the anisotropic etching may also be KOH instead of TMAH; however, a surface (for example, a pair of secondary inclined surfaces 142K and 144K to be described shortly) formed by the etching using TMAH may become smoother. As shown in FIG. 11, with the anisotropic etching, a pair of secondary inclined surfaces 142K and 144K are formed at the intermediate convex body 13K. That is to say, with two rounds of etching, the intermediate convex body 13K including the top surface 140K, one pair of primary inclined surfaces 141K and 143K and one pair of secondary inclined surfaces 142K and 144K is formed on the substrate 10K. The secondary inclined surface 142K is a part at a boundary between the top surface 140K and the primary inclined surface 141K that has been processed by the etching of the second round (etching by using TMAH). The secondary inclined surface 144K is a part at a boundary between the top surface 140K and the primary inclined surface 143K that has been processed by the etching of the second round (etching by using TMAH). Angles α1 respectively formed by the pair of secondary inclined surfaces 142K and 144K with respect to the main surface 11K are 30.1 degrees, and angles α2 respectively formed by the pair of primary inclined surfaces 141K and 143K with respect to the main surface 11K are 54.7 degrees. As shown in FIG. 11, at a timing at which the first step S121 ends, each of corners 152K and 154K formed by the top surface 140 and each of the pair of secondary inclined surfaces 142K and 144K contains an angle. Similarly, corners 151K and 153K respectively formed by the pair of secondary inclined surfaces 142K and 144K and the pair of primary inclined surfaces 141K and 143K contain angles.

Figure 12:
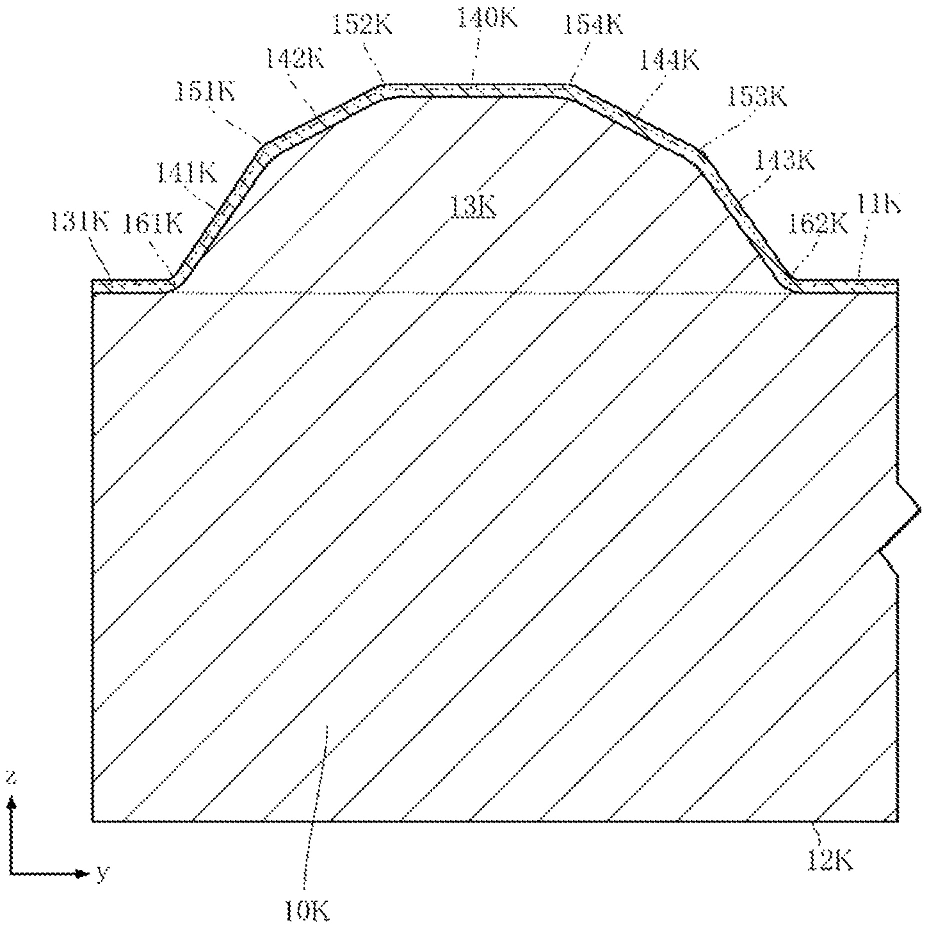
FIG. 12 is a cross-sectional diagram of a main part of a step of a method of fabricating a thermal print head according to an embodiment.
Figure 13:
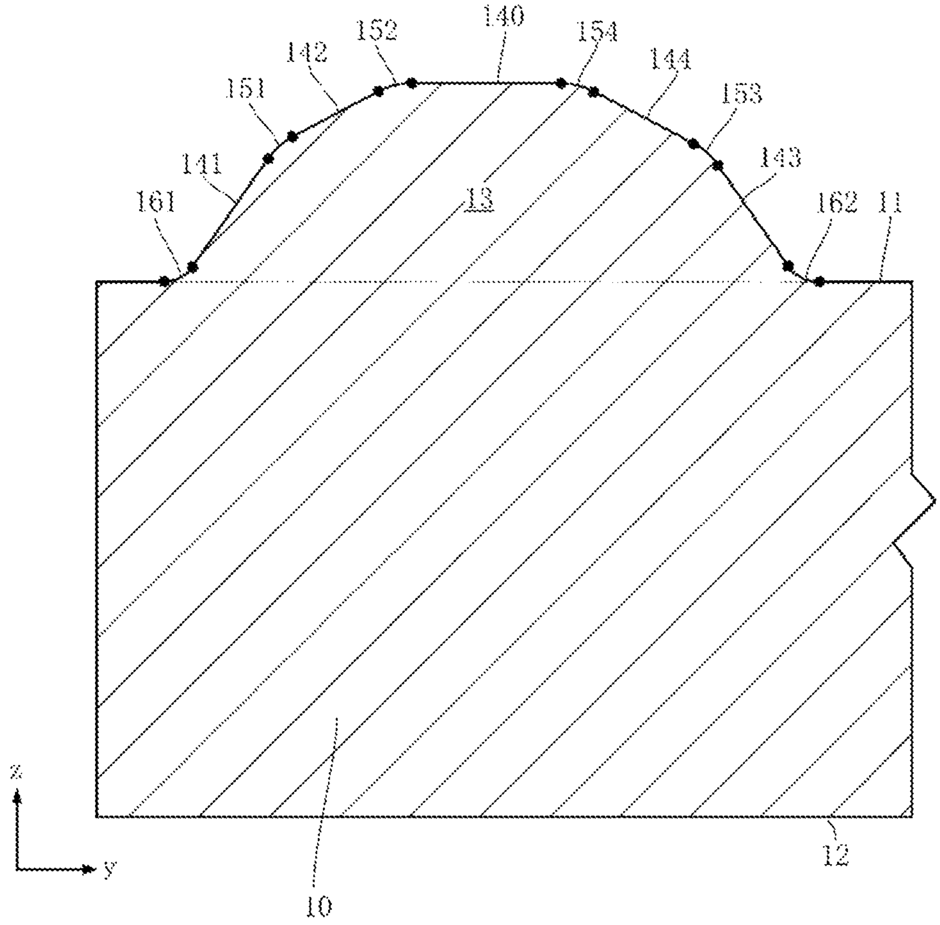
FIG. 13 is a cross-sectional diagram of a main part of a step of a method of fabricating a thermal print head according to an embodiment.

As shown in FIG. 12 and FIG. 13, in the second step S122, the intermediate convex body 13K is processed to form a convex portion 13. In the second step S122, first, as shown in FIG. 12, an oxide film 131K is formed at least on a surface (a surface on an upper side in the thickness direction z) of the intermediate convex body 13K by means of thermal oxidation. In the example shown in FIG. 12, in addition to thermal oxidizing the intermediate convex body 13K, the main surface 11K is also thermally oxidized. At this point in time, regarding the reaction caused by the thermal oxidation, the reaction in a direction perpendicular to the surface of the substrate 10K is faster than the reaction in a direction parallel to the surface of the substrate 10K. Thus, as shown in FIG. 12, the corners 151K to 154K, 161K and 162K of the oxide film 131K are respectively formed as arcs. Moreover, the oxide film 131K is also deposited over the top surface 140K, the pair of primary inclined surfaces 141K and 143K and the pair of secondary inclined surfaces 142K and 144K. The oxide film 131K is an oxide of the substrate 10K, and is made of, for example, $SiO_2$. The oxide film 131K is then removed. The oxide film 131K is removed by means of, for example, etching using hydrogen fluoride (HF). Accordingly, as shown in FIG. 13, the convex portion 13 is formed. As described above, the convex portion 13 includes a top surface 140, a first inclined surface 141, a second inclined surface 142, a third inclined surface 143, a fourth inclined surface 144, a first curved convex surface 151, a second curved convex surface 152, a third curved convex surface 153, a fourth curved convex surface 154, a first curved concave surface 161 and a second curved concave surface 162. For better understanding, solid dots are used in FIG. 13 to represent the boundaries of these surfaces. The formed top surface 140, similar to the top surface 140K, is parallel to the main surface 11 and is flat. Similarly, the formed first inclined surface 141 has the same inclination angle as the primary inclined surface 141K and is flat, and the second inclined surface 142 has the same inclination angle as the secondary inclined surface 142K and is flat. Moreover, the formed third inclined surface 143 has the same inclination angle as the primary inclined surface 143K and is flat, and the fourth inclined surface 144 has the same inclination angle as the secondary inclined surface 144K and is flat.

After performing the substrate processing step S12 (the first step S121 and the second step S122) above, the substrate 10 having the main surface 11, the back surface 12 and the convex portion 13 is formed.

[Insulating Layer Formation Step S13]

Figure 14:
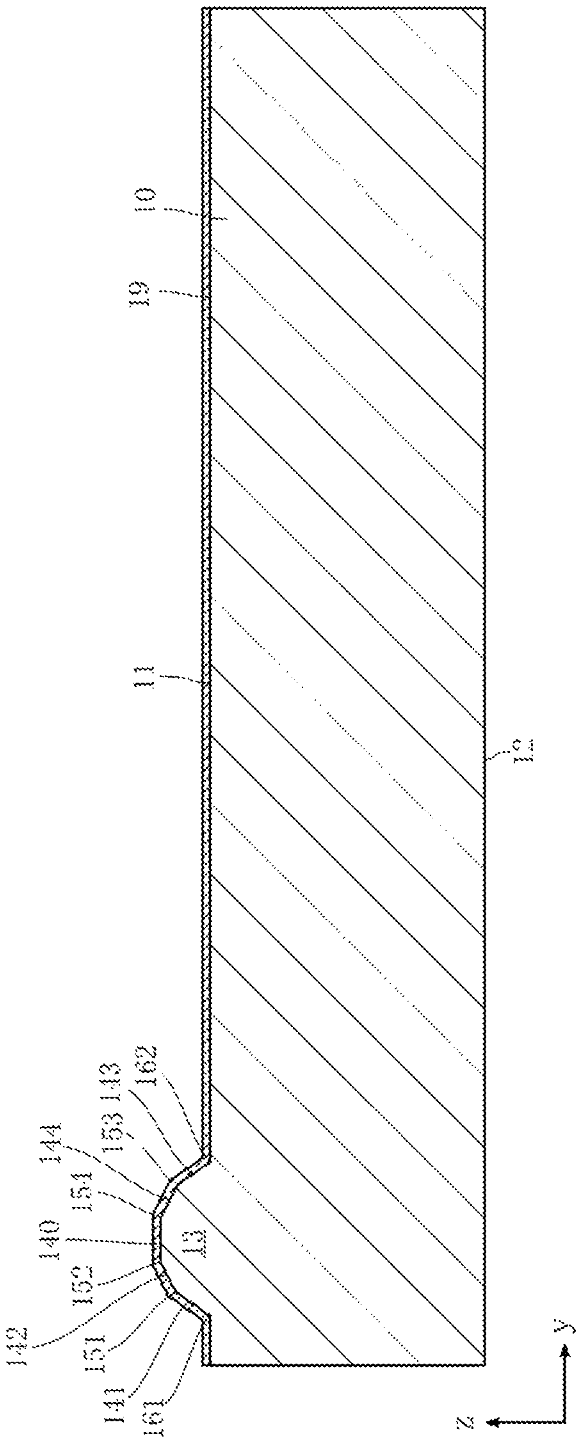
FIG. 14 is a cross-sectional diagram of a step of a method of fabricating a thermal print head according to an embodiment.

Next, as shown in FIG. 14, the insulating layer 19 is formed. The insulating layer 19 is formed by means of CVD, for example, depositing $SiO_2$ formed by using TEOS as a raw gas on the substrate 10. The insulating layer 19 is not limited to being formed by the means above. The formed insulating layer 19 covers the entire surface of the main surface 11 and the convex portion 13.

[Resistive Film Formation Step S14]

Figure 15:
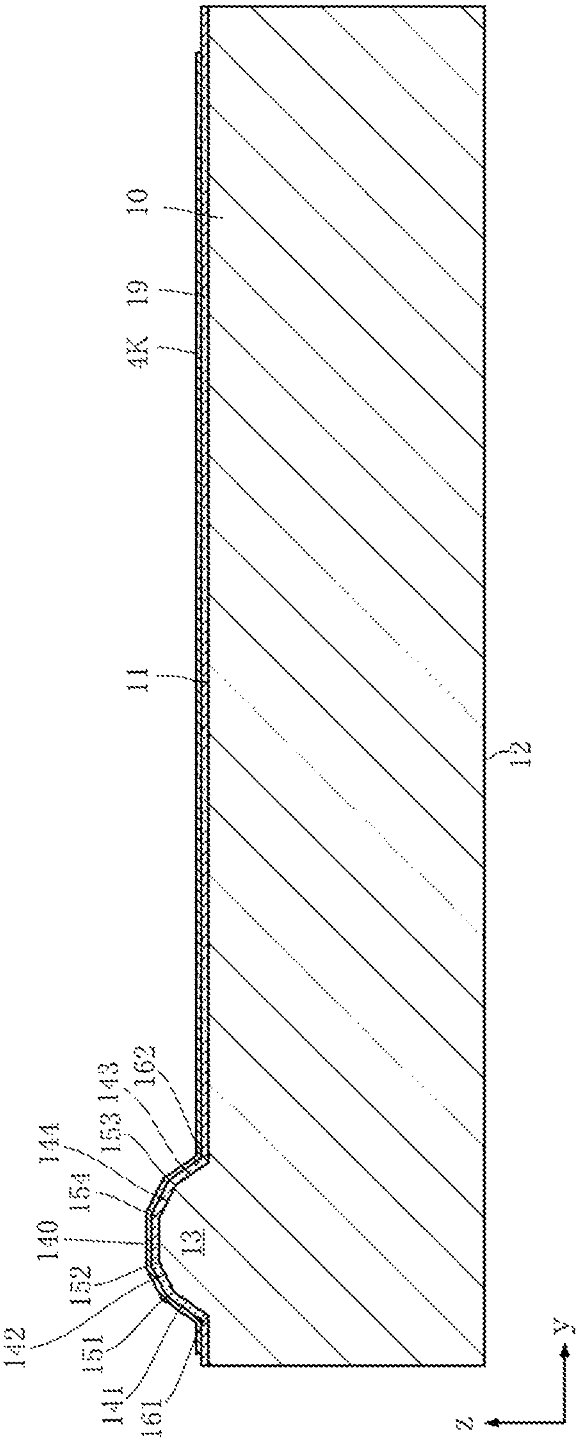
FIG. 15 is a cross-sectional diagram of a step of a method of fabricating a thermal print head according to an embodiment.

Next, as shown in FIG. 15, a resistor film 4K is formed. In the resistor film formation step S14, a TaN film is formed on the insulating layer 19 by, for example, sputtering. The resistor film 4K is not limited to being formed by the means above.

[Wiring Film Formation Step S15]

Figure 16:
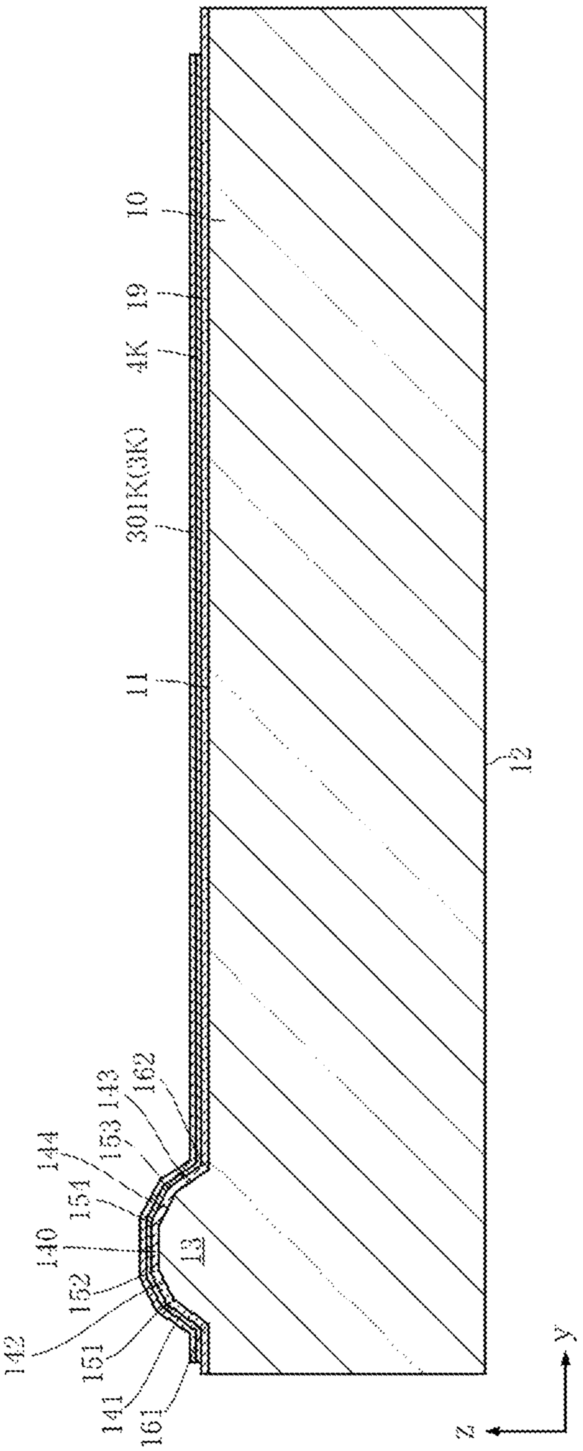
FIG. 16 is a cross-sectional diagram of a step of a method of fabricating a thermal print head according to an embodiment.
Figure 17:
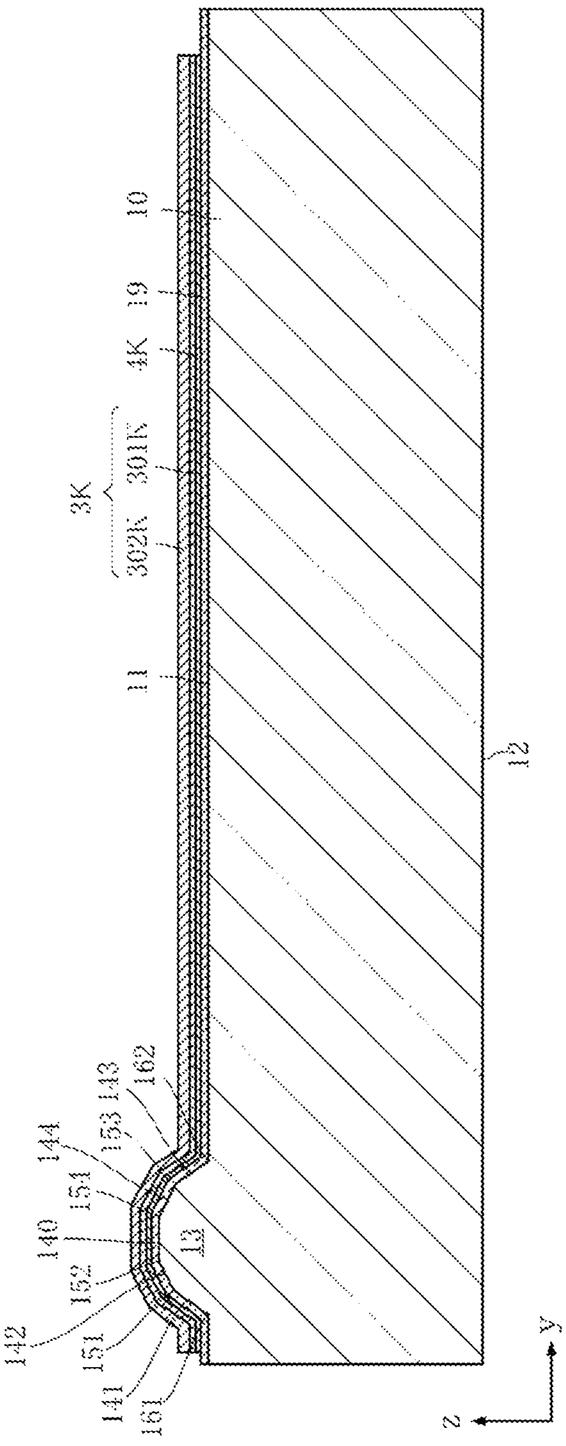
FIG. 17 is a cross-sectional diagram of a step of a method of fabricating a thermal print head according to an embodiment.

Next, as shown in FIG. 16 and FIG. 17, a wiring film 3K is formed. As shown in FIG. 8, the wiring film formation step S15 includes a first film forming process S151 and a second film forming process S152.

In the first film forming process S151, as shown in FIG. 16, a first conductor film 301K is formed on the resistor film 4K. The first conductor film 301K is formed by, for example, sputtering. The first conductor film 301K is, for example, a film made of Ti. At this point in time, the first conductor film 301K covers substantially the entire surface of the resistor film 4K.

In the second film forming process S152, as shown in FIG. 17, a second conductor film 302K is formed on the first conductor film 301K. The second conductor film 302K is formed by, for example, plating or sputtering. The second conductor film 302K is made of, for example, Cu. At this point in time, the second conductor film 302K covers substantially the entire surface of the first conductor film 301K.

[Removal Step S16]

Figure 18:
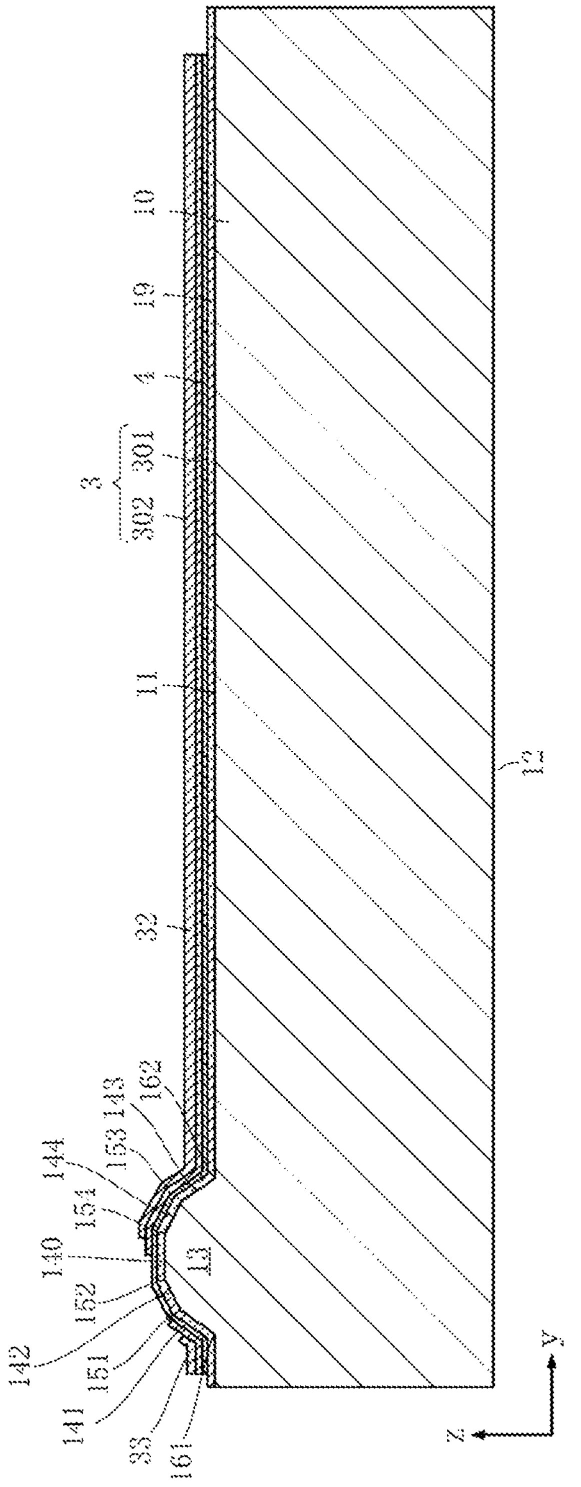
FIG. 18 is a cross-sectional diagram of a step of a method of fabricating a thermal print head according to an embodiment.

Next, as shown in FIG. 18, the second conductor film 302K, the first conductor film 301K and the resistor film 4K are appropriately partially removed. As shown in FIG. 8, the removal step S16 has a first partial removal process S161, a second partial removal process S162 and a third partial removal process S163.

In the first partial removal process S161, the second conductor film 302K is partially removed. In the second partial removal process S162, the first conductor film 301K is partially removed. In the third partial removal process S163, the resistor film 4K is partially removed. The first partial removal process S161, the second partial removal process S162 and the third partial removal process S163 are performed respectively by, for example, etching. The second conductor layer 302 is formed by the first partial removal process S161, the first conductor layer 301 is formed by the second partial removal process S162, and the resistor layer 4 is formed by the third partial removal process S163. The formed first conductor layer 301 and second conductor layer 302 form the wiring layer 3, and the wiring layer 3 has a common electrode 31, a plurality of individual electrodes 32 and a plurality of relay electrodes 33. The formed resistor layer 4 includes the plurality of heat generating portions 41 and is cut according to the heat generating portions 41. In this embodiment, the resistor film formation step S14 and the step of performing the third partial removal process S163 are equivalent to "forming a resistor layer" described in the claims. In this embodiment, the wiring film formation step S15 and the steps of performing the first partial removal process S161 and the second partial removal process S162 are equivalent to "forming a wiring layer" recited in the claims.

[Protective Layer Formation Step S17]

Next, a protective layer 2 is formed. The protective layer 2 is formed by, for example, depositing SiN on the insulating layer 19, the wiring layer 3 (the first conductor layer 301 and the second conductor 302) and the resistor layer 4 by means of CVD, hence forming the protective layer. Moreover, the protective layer 2 is partially removed by means of etching to form a pad opening 21.

[Singulation Step S181]

Next, the substrate 10 is appropriately cut with respect to the head substrate 1. In the substrate preparation step S11, the singulation step S181 may be omitted when the substrate 10 corresponding to one head substrate 1 is prepared. The singulation step S181 is performed by means of laser cutting or cutting according to the raw material of the substrate 10.

[Assembly Step S182]

Then, the heat dissipation component 8 is installed on the head substrate 1 and the connection substrate 5, the driver IC 7 is mounted, the plurality of lead wires 61 and 62 are bonded, and the protective resin 78 is formed.

As described above, with the steps shown in FIG. 8, the thermal print head A1 shown in FIG. 1 to FIG. 7 is fabricated.

The functions and effects of the thermal print head A1 are given below.

In the thermal print head A1, the convex portion 13 includes a flat first surface on which each of the plurality of heat generating portions 41 is disposed. In the thermal print head A1, the first surface includes the second inclined surface 142. Moreover, the convex portion 13 has the first curved convex surface 151 connected to the first surface. According to the structure, a curved surface (the first curved convex surface 151) is provided on an end portion of the first surface (the second inclined surface 142) on which each of the heat generating portions 41 is disposed. Thus, the end portion of the first surface (the second inclined surface 142) on which each of the heat generating portions 41 is disposed becomes an arcuate shape. Different from this structure, in the convex portion 13, when the structure (for example, the structure shown in FIG. 11 is kept unchanged) of the angled end portion of the surface on which each of the heat generating portions 41 is disposed is conveyed to the print medium 99, the friction load between the protective layer 2 and the print medium 99 increases at the angled portion. Thus, the protective layer 2 or the print medium 99 is worn, and foreign objects such as scraps of the print medium 99 (for example, paper scraps) or scraps of surface layers of the thermal print head are then generated. On the other hand, in the thermal print head A1, as described above, the end portion of the first surface (the second inclined surface 142) on which each of the heat generating portions 41 is disposed becomes an arcuate shape, and so the friction load between the protective layer 2 and the print medium 99 is reduced. Accordingly, wear of the protective layer 2 and wear of the print medium 99 can be inhibited, thereby mitigating the generation of foreign objects. Therefore, the thermal print head A1 is capable of inhibiting the generation of foreign objects and hence mitigating degraded printing quality.

In the thermal print head A1, the convex portion 13 further has the second curved convex surface 152. According to this structure, two ends of the first surface (the second inclined surface 142) in the sub-scanning direction y become arcuated shapes. This structure is beneficial for the print medium 99 to pass through smoothly and for mitigating the generation of foreign objects.

In the thermal print head A1, each of the heat generating portions 41 is disposed on the flat first surface (the second inclined surface 142). According to this structure, compared with a situation where each of the heat generating portions 41 is disposed on a curved surface, the contact between the protective layer 2 on each of the heat generating portions 41 and the print medium 99 gets better, and good heat transfer efficiency to the print medium 99 is maintained. Thus, the thermal print head A1 is preferred with respect to enhanced printing quality.

In the thermal print head A1, the convex portion 13 has the first inclined surface 141 and the second inclined surface 142. According to this structure, the first inclined surface 141 and the second inclined surface 142 inclining at two levels with respect to the main surface 11 (the top surface 140) become a configuration arranged in the sub-scanning direction y. Thus, the angle formed by the top surface 140 and the first inclined surface 141 can be reduced, and this is preferred with respect to enhancing printing quality. Moreover, as the angle formed by the top surface 140 and the first inclined surface 141 becomes smaller, wear of the protective layer 2 generated by passing through of the print medium 99 during printing can be better inhibited.

In the thermal print head A1, the first surface includes the second inclined surface 142. That is to say, each of the heat generating portions 41 is disposed on the second inclined surface 142. According to this structure, the thermal printer Pr becomes a mechanism (a direct-route mechanism) that performs conveyance without curving the print medium 99, and this is preferred in such aspect.

In the thermal print head A1, the sub heat generating portions 35A and 35B are disposed at two ends of each of the heat generating portions 41 in the sub-scanning direction y. During energization, the temperatures of the sub heat generating portions 35A and 35B are lower than that of each of the heat generating portions 41 and higher than that of the laminated part of the second conductor layer 302 and the first conductor layer 301. Accordingly, compared to when the sub heat generating portions 35A and 35B are not provided, the temperature gradient in the sub-scanning direction y can be alleviated. If the sub heat generating portions 35A and 35B are not provided, the laminated part of the second conductor layer 302 and the first conductor layer 301 is adjacent to each of the heat generating portions 41, such that the temperature gradient becomes larger. As a result, thermal stress produced by the temperature difference at their boundary may cause breakage in parts of their boundary. However, in the thermal print head A1, as described above, the temperature gradient is moderated with the sub heat generating portions 35A and 35B, and so breakage or damage caused by thermal stress can be suppressed. Moreover, in the thermal print head A1, before the print medium 99 is conveyed to each of the heat generating portions 41, pre-heating is implemented by the sub heat generating portion 35A disposed on the upstream side of each of the heat generating portions 41 in the sub-scanning direction y. Accordingly, by pre-heating with the sub heat generating portion 35A, colors can be exhibited in a quicker and clearer manner during printing of each of the heat generating portions 41. Therefore, the thermal print head A1 is capable of enhancing printing quality and increasing printing speed.

In the thermal print head A1, the print medium 99 is conveyed from the first curved convex surface 151 toward the first surface (the second inclined surface 142) in the sub-scanning direction y. According to this structure, a front end of the print medium 99 can be avoided from collisions against the protective layer 2 on the convex portion 13 during conveyance of the print medium 99. Such collisions against the convex portion 13 may cause the generation of scraps of the protective layer 2. More particularly, when the print medium 99 is plastic cards that are harder than common printing or information paper, scraps of the protective layer 2 are easily generated due to the collisions of the print medium 99 against the protective layer 2 on the convex portion 13. However, the thermal print head A1 is capable of avoiding the front end of the print medium 99 from collisions against the protective layer 2 on the convex portion 13, and so the generation of foreign objects is mitigated, and this is more preferred in such aspect.

In the method of fabricating the thermal print head A1, the substrate processing step S12 includes the second step S122. In the second step S122, the surface of the intermediate convex body 13K is thermally oxidized to form the oxide film 131K. According to the process, the oxide film 131K is formed as arcuate shapes respectively at the corners 151K to 154K, 161K and 162K by means of deposition. Accordingly, the first curved convex surface 151, the second curved convex surface 152, the third curved convex surface 153 and the fourth curved convex surface 154 are formed at the convex portion 13, and the first curved concave surface 161 and the second curved concave surface 162 can also be formed.

Next, a method of fabricating another thermal print head of the present disclosure is described below. For example, in the second step S122 of the substrate processing step S12, an etching process or a blast process may also be implemented instead of implementing formation of the oxide film 13K and removal of the oxide film 13K.

In an example wherein an etching process is implemented in the second step S122, the etching process may be either of dry etching and wet etching. For example, in the second step S122 of this variation example, an etching process is implemented at least on the surface (one pair of primary inclined surfaces 141K and 143K and one pair of secondary inclined surfaces 142K and 144K) of the intermediate convex body 13K. In this variation example, in addition to implementing an etching process on the surface of the intermediate convex body 13K, an etching process is also implemented on the main surface 11K. That is to say, in this variation example, for the substrate 10K (referring to FIG. 11) after the first step S121, an etching process is implemented on the surface on an upper side in the thickness direction z. In dry etching, an etching gas, for example, a reactive ion gas or a plasma gas, is emitted toward the surface of the substrate 10K on the upper side in the thickness direction z. In wet etching, the surface of the substrate 10K on the upper side in the thickness direction z is exposed to an etching solvent such as nitric acid/hydrofluoric acid. Accordingly, the same convex portion 13 (referring to FIG. 13) of the thermal print head A1 is formed from the intermediate convex body 13K.

Figure 19:
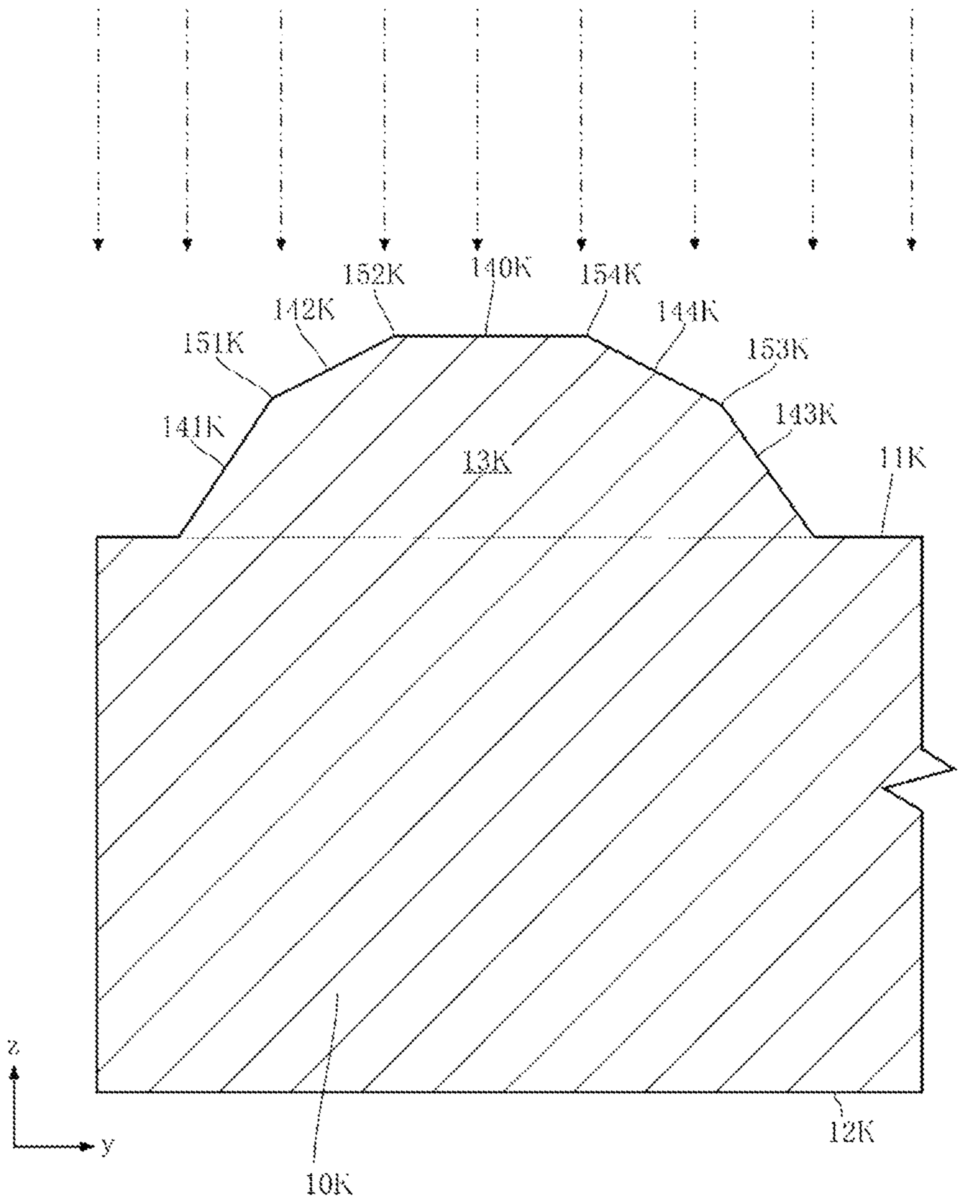
FIG. 19 is a cross-sectional diagram of a main part of a step of a method of fabricating a thermal print head according to a variation example.

In an example wherein a blast process is implemented in the second step S122, the blast process may be either of air shot blast (sand blast) and wet shot blast (wet blast). For example, in the second step S122 of this variation example, a blast process is implemented at least on the surface (one pair of primary inclined surfaces 141K and 143K and one pair of secondary inclined surfaces 142K and 144K) of the intermediate convex body 13K, as shown in FIG. 19. In this variation example, in addition to implementing a blast process on the surface of the intermediate convex body 13K, a blast process is also implemented on the main surface 11K. That is to say, in this variation example, as shown in FIG. 19, for the substrate 10K (referring to FIG. 11) after the first step S121, a blast process is implemented on the surface on an upper side in the thickness direction z. During sand blast, a finely granulated abrasive is sprayed by using compressed air on the surface of the substrate 10K on the upper side in the thickness direction z. During wet blast, a liquid mixture formed by mixing a finely granulated abrasive in water is sprayed by using compressed air on the surface of the substrate 10K on the upper side in the thickness direction z. Accordingly, the same convex portion 13 (referring to FIG. 13) of the thermal print head A1 is formed from the intermediate convex body 13K.

Figure 20:
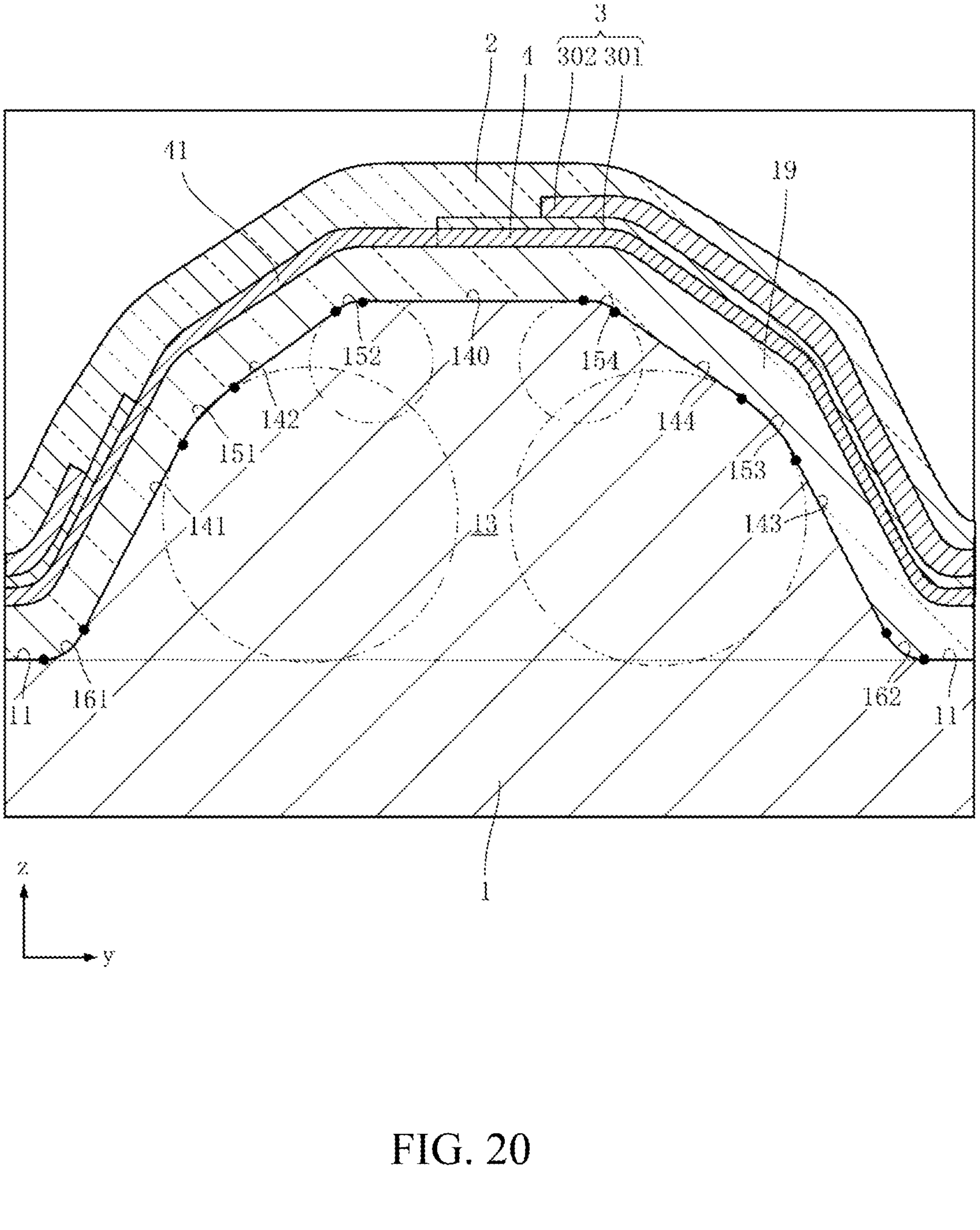
FIG. 20 is a cross-sectional diagram of a main part of the thermal print head according to a variation example, and corresponds to the cross section of FIG. 7.

Moreover, when an etching process or a blast process is implemented in the second step S122, as shown in FIG. 20, in the convex portion 13, the curvature of the first curved convex surface 151 is sometimes less than the curvature of the second curved convex surface 152. In other words, the radius of curvature of the first curved convex surface 151 is sometimes greater than the radius of curvature of the second curved convex surface 152. Similarly, the curvature of the third curved convex surface 153 is sometimes less than the curvature of the fourth curved convex surface 154. In other words, the radius of curvature of the third curved convex surface 153 is sometimes greater than the radius of curvature of the fourth curved convex surface 154. The thermal print head having the convex portion 13 in the shape as shown in FIG. 20, similar to the thermal print head 1, is capable of inhibiting the generation of foreign objects and hence mitigating degraded printing quality. Moreover, in the thermal print head of this variation example, because the first curved convex surface 151 is a more moderate curved surface than the first curved convex surface 151 of the thermal print head A1, the generation of foreign objects is inhibited, and this is more preferred in such aspect.

Next, another configuration example of the thermal print head A1 of the present disclosure is described below.

Figure 21:
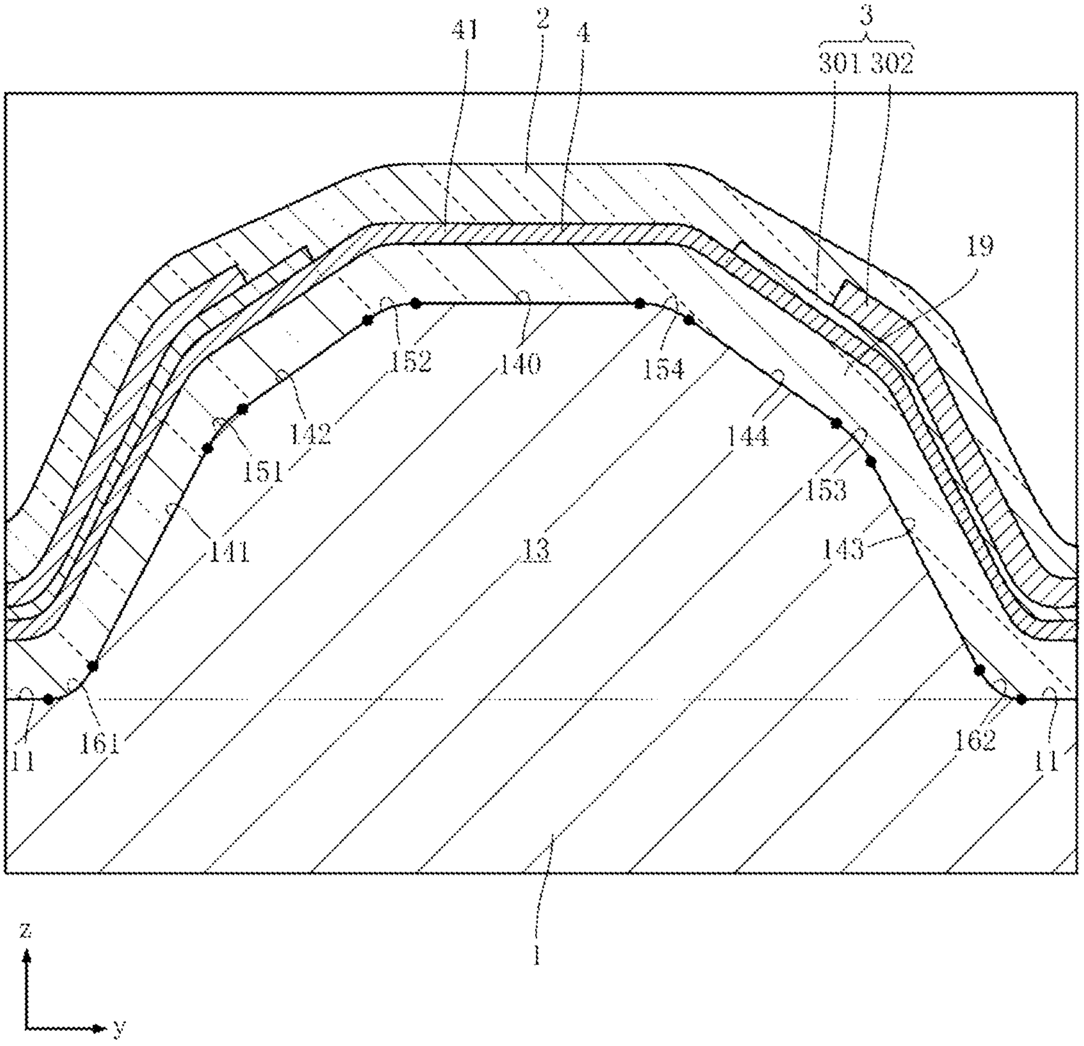
FIG. 21 is a cross-sectional diagram of a main part of the thermal print head according to a variation example, and corresponds to the cross section of FIG. 7.

For the thermal print head A1, an example where the plurality of heat generating portions 41 are disposed on the second inclined surface 142 is illustrated. However, different from this structure, each of the heat generating portions 41 may also be formed on the top surface 140, as shown in FIG. 21. The thermal print head having the convex portion 13 in the shape as shown in FIG. 21, similar to the thermal print head A1, is capable of inhibiting the generation of foreign objects and hence mitigating degraded printing quality.

Figure 22:
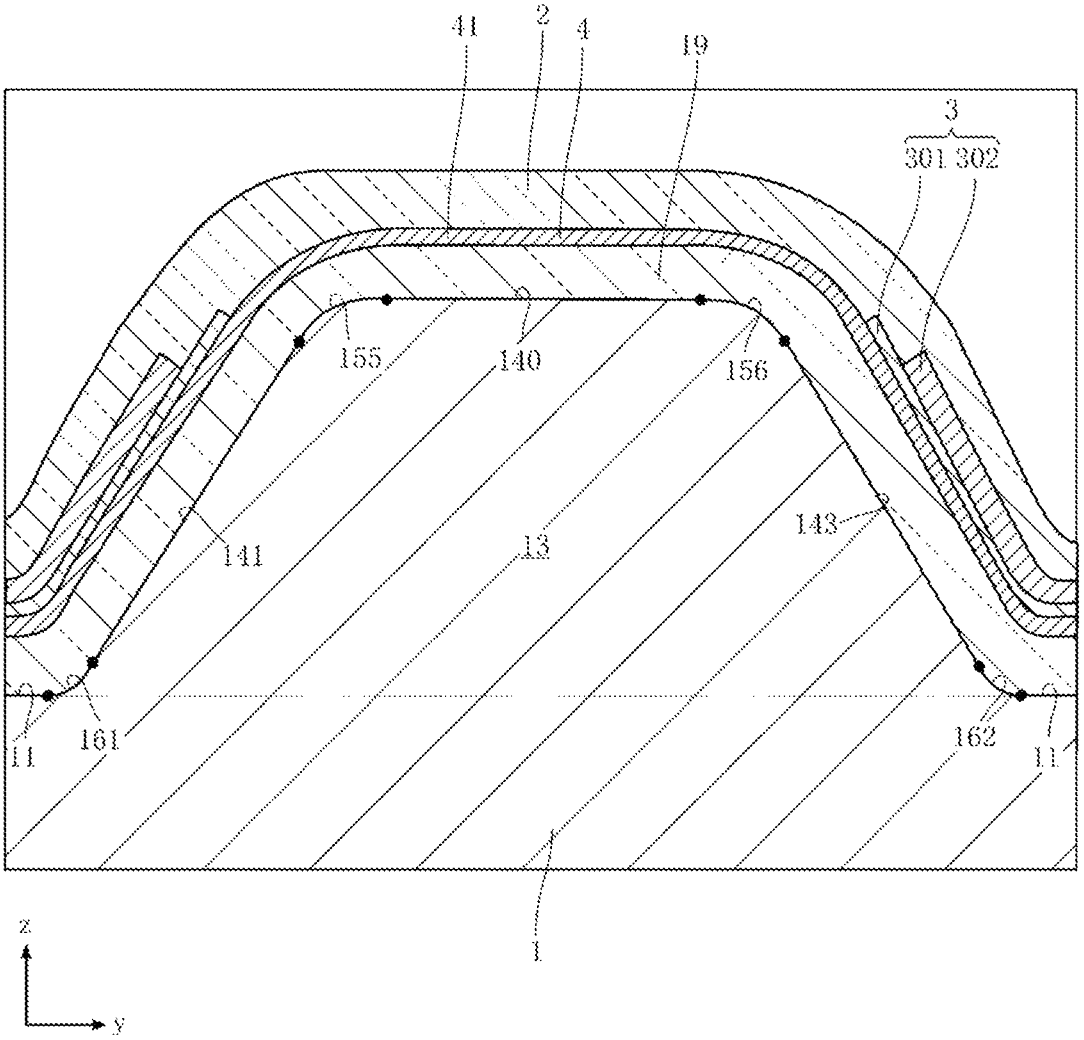
FIG. 22 is a cross-sectional diagram of a main part of the thermal print head according to a variation example, and corresponds to the cross section of FIG. 7.

In the thermal print head A1, the convex portion 13 has the second inclined surface 142 and the fourth inclined surface 144. However, different from this structure, the convex portion 13 may exclude these surfaces, as shown in FIG. 22. The convex portion 13 shown in FIG. 22 includes the top surface 140, the first inclined surface 141, the third inclined surface 143, the first curved convex surface 155, the second curved convex surface 156, the first curved concave surface 161 and the second curved concave surface 162. The first curved convex surface 155 is disposed between the first inclined surface 141 and the top surface 140 in the sub-scanning direction y. The second curved convex surface 156 is disposed between the third inclined surface 143 and the top surface 140 in the sub-scanning direction y. The first curved convex surface 155 has a curvature substantially equal to a curvature of the second curved convex surface 156. Regarding the convex portion 13 shown in FIG. 22, for example, in the first step S121 of the substrate processing step S12, the convex portion 13 is formed by implementing only etching of the first round but not etching of the second round. The thermal print head having the convex portion 13 in the shape as shown in FIG. 22, similar to the thermal print head A1, is capable of inhibiting the generation of foreign objects and hence mitigating degraded printing quality.

Figure 23:
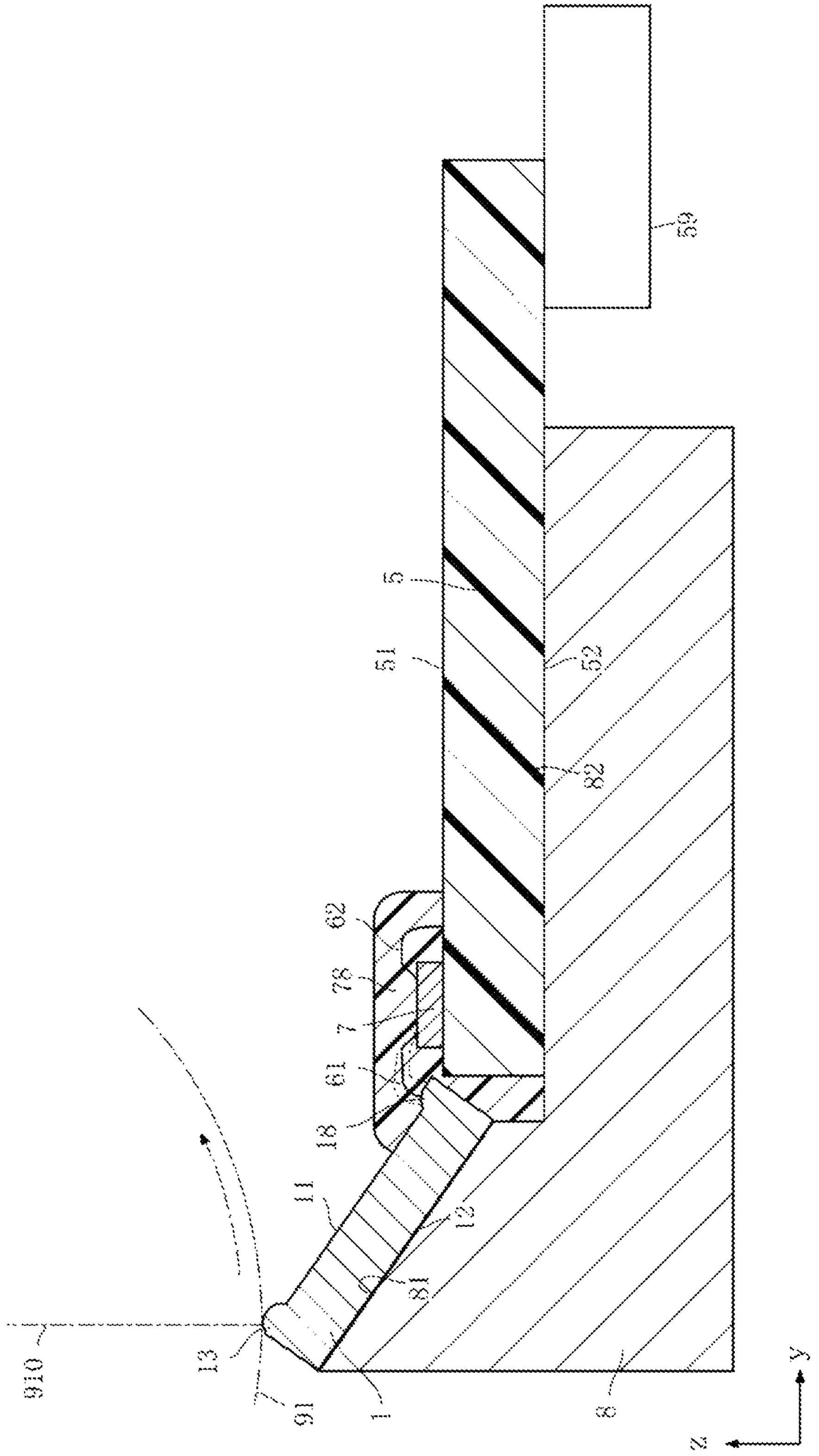
FIG. 23 is a partial enlarged cross-sectional diagram of a thermal printer having a thermal print head according to an embodiment, and corresponds to the cross section of FIG. 4.

In the thermal print head A1, the shape of the heat dissipation component 8 is not limited to the example shown in FIG. 4, and for example, the first support surface 81 may also incline with respect to the second support surface 82, as shown in FIG. 23.

Regarding the thermal print head A1, an example where the head substrate 1 is made of the monocrystalline semiconductor is illustrated; however, the present disclosure is not limited to this example and the head substrate 1 may be made of ceramics.

It should be noted that the thermal print head, the thermal printer and the method of fabricating a thermal print head of the present disclosure are not limited by the embodiments described above. Various designs and modifications may be made as desired to the specific structures of the components of the thermal print head and the thermal printer as well as to the specific processes of the steps of the method of fabricating a thermal print head. For example, the thermal print head, the thermal printer and the method of fabricating a thermal print head of the present disclosure include related implementation details provided in the notes below.

The invention claimed is:

1. A thermal print head, comprising:

a substrate, having a main surface facing one side in a thickness direction;

a resistor layer, including a plurality of heat generating portions arranged in a main scanning direction and supported by the substrate; and a wiring layer, forming a power path to the plurality of heat generating portions and supported by the substrate, wherein the substrate includes a convex portion protruding from the main surface and extending along the main scanning direction, the convex portion includes:

a flat first surface on which each of the plurality of heat generating portions is disposed; and a first curved convex surface connected to the first surface, wherein the wiring layer comprises a first conductive layer and a second conductive layer, the plurality of heat generating portions are exposed from the first conductive layer, and a part of the first conductive layer is exposed from the second conductive layer, wherein the convex portion further includes a top surface parallel to the main surface, and wherein a portion of the top surface of the convex portion is covered by both the first conductive layer and the second conductive layer.

2. The thermal print head of claim 1, wherein the convex portion further includes a first inclined surface inclined with respect to the main surface, and the first inclined surface is located between the main surface and the top surface in a sub-scanning direction.

3. The thermal print head of claim 2, wherein the convex portion has a second inclined surface inclined with respect to the main surface, the second inclined surface is located between the top surface and the first inclined surface in the sub-scanning direction, and an inclination angle of the second inclined surface with respect to the main surface is less than an inclination angle of the first inclined surface with respect to the main surface.

4. The thermal print head of claim 3, wherein the second inclined surface constitutes the first surface.

5. The thermal print head of claim 4, wherein the convex portion has a second curved convex surface connected to the first surface, the first curved convex surface is disposed between the first surface and the first inclined surface in the sub-scanning direction, and the second curved convex surface is disposed between the first surface and the top surface in the sub-scanning direction.

6. The thermal print head of claim 5, wherein the first curved convex surface has a curvature less than a curvature of the second curved convex surface.

7. The thermal print head of claim 5, wherein the convex portion has a third inclined surface and a fourth inclined surface arranged in a manner of being separated from the first surface by the top surface, the fourth inclined surface is located between the top surface and the third inclined surface in the sub-scanning direction, and an inclination angle of the fourth inclined surface with respect to the main surface is less than an inclination angle of the third inclined surface with respect to the main surface.

8. The thermal print head of claim 6, wherein the convex portion has a third inclined surface and a fourth inclined surface arranged in a manner of being separated from the first surface by the top surface, the fourth inclined surface is located between the top surface and the third inclined surface in the sub-scanning direction, and an inclination angle of the fourth inclined surface with respect to the main surface is less than an inclination angle of the third inclined surface with respect to the main surface.

9. The thermal print head of claim 7, wherein the convex portion has a third curved convex surface and a fourth curved convex surface respectively connected to the fourth inclined surface, the third curved convex surface is disposed between the top surface and the fourth inclined surface in the sub-scanning direction, and the fourth curved convex surface is disposed between the fourth inclined surface and the third inclined surface in the sub-scanning direction.

10. The thermal print head of claim 2, wherein the top surface constitutes the first surface.

11. The thermal print head of claim 3, wherein the top surface constitutes the first surface.

12. The thermal print head of claim 2, wherein the convex portion has a curved concave surface located between the main surface and the first inclined surface in the sub-scanning direction.

13. The thermal print head of claim 1, wherein the substrate is made of a monocrystalline semiconductor.

14. A thermal printer, comprising:

the thermal print head of claim 1; and a platen, facing the thermal print head and conveying a print medium in the sub-scanning direction.

15. The thermal printer of claim 14, wherein the print medium is conveyed from the first curved convex surface toward the first surface in the sub-scanning direction.

16. A method of fabricating a thermal print head, comprising:

providing a substrate made of a monocrystalline semiconductor;

processing the substrate to have a main surface facing one side in a thickness direction and have a convex portion protruding from the main surface and extending in a main scanning direction;

forming a resistor layer supported by the substrate and including a plurality of heat generating portions arranged in the main scanning direction; and forming a wiring layer which is supported by the substrate and forms a power path to the plurality of heat generating portions, wherein the convex portion includes:

a flat first surface on which each of the plurality of heat generating portions is disposed; and a first curved convex surface connected to the first surface, and wherein the processing of the substrate includes:

forming an intermediate convex body having the first surface and protruding from the main surface; and forming a first curved convex surface on the intermediate convex body, wherein the wiring layer comprises a first conductive layer and a second conductive layer, the plurality of heat generating portions are exposed from the first conductive layer, and a part of the first conductive layer is exposed from the second conductive layer, wherein the convex portion further includes a top surface parallel to the main surface, and wherein a portion of the top surface of the convex portion is covered by both the first conductive layer and the second conductive layer.

17. The method of claim 16, wherein after an oxide film is formed on at least a surface of the intermediate convex body, the oxide film is removed.

18. The method of claim 16, wherein at least a surface of the intermediate convex body is etched.

19. The method of claim 16, wherein at least a shot blast is performed on a surface of the intermediate convex body.

20. The method of claim 19, wherein the shot blast is a wet blast.

* * * * *